US008438175B2

(12) United States Patent
Papke et al.

(10) Patent No.: US 8,438,175 B2
(45) Date of Patent: May 7, 2013

(54) SYSTEMS, METHODS AND ARTICLES FOR VIDEO ANALYSIS REPORTING

(75) Inventors: Norbert Gernot Papke, Vancouver (CA); Bartholomeus T. W. Klijsen, Surrey (CA)

(73) Assignee: Lighthaus Logic Inc., Vancouver (CA)

( * ) Notice: Subject to any disclaimer, the term of this patent is extended or adjusted under 35 U.S.C. 154(b) by 0 days.

(21) Appl. No.: 13/049,663

(22) Filed: Mar. 16, 2011

(65) Prior Publication Data
US 2011/0231419 A1 Sep. 22, 2011

Related U.S. Application Data

(60) Provisional application No. 61/340,382, filed on Mar. 17, 2010, provisional application No. 61/396,169, filed on May 24, 2010.

(51) Int. Cl.
*G06F 17/30* (2006.01)
(52) U.S. Cl.
USPC .......................... 707/756; 707/769; 382/103
(58) Field of Classification Search .................... 707/756
See application file for complete search history.

(56) References Cited

U.S. PATENT DOCUMENTS

| | | | | |
|---|---|---|---|---|
| 5,459,665 A * | 10/1995 | Hikita et al. | ................... | 701/118 |
| 5,465,115 A * | 11/1995 | Conrad et al. | ................. | 348/155 |
| 7,061,871 B2 * | 6/2006 | Sheldon et al. | ............... | 370/242 |
| 7,612,796 B2 * | 11/2009 | Lev-Ran et al. | ............... | 348/143 |
| 8,189,049 B2 * | 5/2012 | Lopota et al. | ................. | 348/152 |
| 2009/0322881 A1 * | 12/2009 | Shu et al. | ....................... | 348/148 |
| 2011/0228984 A1 | 9/2011 | Papke et al. | .................... | 382/103 |

OTHER PUBLICATIONS

Papke et el., "Systems and Methods for Video Analysis Reporting," U.S. Appl. No. 61/396,169, filed May 24, 2010, 53 pages.
Papke et al., "Systems and Methods for Video Analysis," U.S. Appl. No. 61/340,382, filed Mar. 17, 2010, 40 pages.

* cited by examiner

*Primary Examiner* — Binh V Ho
(74) *Attorney, Agent, or Firm* — Seed IP Law Group PLLC

(57) ABSTRACT

A macro video analysis system including a first connection to a first persistent database of a first video analysis system monitoring a first remote location, a second connection to a second persistent database of a second video analysis system monitoring a second remote location, a macro persistent database archiving a respective event generated by each the first remote video analysis system monitoring the first remote location and the second video analysis system monitoring the second remote location and wherein each respective event is respectively transmitted through the first connection and the second connection, and a database query module to evaluate the events.

10 Claims, 13 Drawing Sheets

SYSTEMS, METHODS AND ARTICLES FOR VIDEO ANALYSIS REPORTING

CROSS REFERENCE TO RELATED APPLICATIONS

This application claims benefit under 35 U.S.C. 119(e) to U.S. provisional patent application Ser. No. 61/340,382, filed Mar. 17, 2010 and U.S. provisional patent application Ser. No. 61/396,169, filed May 24, 2010, which are incorporated herein by reference in their entirety.

BACKGROUND

1. Field

The present systems, methods and articles relate generally to analyzing video and more particularly a system, method and article related to video analytics.

2. Description of the Related Art

Video analytics is a technology that is used to analyze video for specific data, behavior, objects or attitude. It has a wide range of applications including safety and security. Video analytics employ software algorithms run on processors inside a computer or on an embedded computer platform in or associated with video cameras, recording devices, or specialized image capture or video processing units. Video analytics algorithms are integrated with video and called Intelligent Video Software systems that run on computers or embedded devices (e.g., embedded digital signal processors) in IP cameras or encoders or other image capture devices. The technology can evaluate the contents of video to determine specified information about the content of that video.

Examples of video analytics applications include: counting the number of pedestrians entering a door or geographic region, determining a location, speed and direction of travel, identifying suspicious movement of people or assets.

Video analytics should not be confused with traditional Video Motion Detection (VMD), a technology that has been commercially available for over 20 years. VMD uses simple rules and assumes that any pixel change in the scene is important. One limitation of VMD is that there are an inordinate number of false alarms.

BRIEF SUMMARY

A macro video analysis system may be summarized as including a first connection to a first persistent databases of a first video analysis system monitoring a first remote location, a second connection to a second persistent databases of a second video analysis system monitoring a second remote location, a macro persistent database archiving a respective event generated by each the first remote video analysis system monitoring the first remote location and the second video analysis system monitoring the second remote location and wherein each respective event is respectively transmitted through the first connection and the second connection, and a database query module to evaluate the events.

At least one of the first remote location and the second remote location may be selected from the group consisting of: a retail location, a retail zone of the retail location, a sub-zone of the retail location, a loading zone of the retail location, a public zone of the retail location, and a constriction point between two zones of the retail location. The database query module may include at least one of a traffic flow timeline reporting module, an entrance flow timeline reporting module, a zone flow timeline reporting module, a queue depth timeline reporting module, an object dwell timeline reporting module, a face dwell timeline reporting module, a demographics classification timeline reporting module, a heatmap reporting module, a wait-time reporting module, and a mixed reporting module. At least one event may correspond to occupancy of a zone, an individual transitioning between two zones, demographic information of the individual, dwell time of the individual within a region, dwell time of the individual within an area, a track and/or dwell time heatmap, and a wait-time estimation.

A method for video analytics may be summarized as including establishing a first connection to a first persistent databases of a first video analysis system monitoring a first remote location, transmitting a first event generated by the first video analysis system through the first connection to a macro persistent database, establishing a second connection to a second persistent databases of a second video analysis system monitoring a second remote location, transmitting a second event generated by the second video analysis system through the second connection to the macro persistent database, and executing a database query on the first event and the second event.

At least one of the first event and the second event may be non-addressable by the macro persistent database, and may include manipulating at least one of the first event and the second into a format addressable by the macro persistent database. The method may include archiving a result of the database query within the macro persistent database. The method may include executing a second database query on the result of the database query and an additional event. The additional event may be selected from the group consisting of: a third event from the first persistent database, a fourth event from the second persistent database, and an additional macro event. The database query may be selected from the group consisting of: a traffic flow timeline reporting database query, an entrance flow timeline database query, a zone flow timeline database query, a queue depth timeline database query, an object dwell timeline database query, a face dwell timeline database query, a demographics classification timeline database query, a dwell-time database query, a customer count database query, and an employee count database query, a population count database query.

A method of operating a macro video analytics system may be summarized as including storing at a macro event persistent storage component a first number of sets of event metadata generated by a first video analysis system monitoring a first remote location remote from the macro event persistent storage component, at least some of the first number of sets of event metadata indicative of an occurrence of respective ones of events occurring at the first remote location, the first number of sets of event metadata representing aspects of the respective event without all of a number of digitized images on which identification of the occurrence of the event was based; storing at the macro event persistent storage component a second number of sets of event metadata from a second video analysis system monitoring a second remote location remote from the macro event persistent storage component, at least some of the second number of sets of event metadata indicative of an occurrence of respective ones of events occurring at the second remote location, the second number of sets of event metadata representing aspects of the respective event without all of a number of digitized images on which identification of the occurrence of the event was based; and executing by at least one processor at least a first query on information including both of at least one of the stored first number of sets of event metadata and at least one of the stored second number of sets of event metadata.

The method may further include transforming a format of at least one of the first number of sets of event metadata by the macro event persistent storage component before storing the first number of sets of event metadata at the macro event persistent storage component.

The method may further include storing a result of the first query at the macro event persistent storage component.

The method may further include executing by at least one processor at least a second query on information including the stored result of the first query. Storing at a macro event persistent storage component a first number of sets of event metadata may include storing the first number of sets of event metadata in a micro persistent database implemented by at least one processor and at least one non-transitory storage medium of the macro event persistent storage component and storing at the macro event persistent storage component a second number of sets of event metadata may include storing the second number of sets of event metadata in the micro persistent database. Executing by at least one processor at least a first query on information may include at least one of executing a traffic flow timeline reporting database query, an entrance flow timeline database query, a zone flow timeline database query, a zone occupancy timeline database query, a queue depth timeline database query, an object dwell timeline database query, a face dwell timeline database query, a demographics classification timeline database query, a customer count database query, an employee count database query, a population count database query, a tracking map database query, a wait-time database query, a mixed reporting database query, or a statistical reporting database query.

A macro video analysis system may be summarized as including at least one processor; and a macro event persistent storage component including at least one non-transitory storage medium communicatively coupled to the at least one processor and which stores processor executable instructions which when executed by the at least one processor cause the at least one processor to: store to the at least one non-transitory storage medium of the macro event persistent storage component a first number of sets of event metadata generated by a first video analysis system that monitors a first remote location remote from the macro event persistent storage component, at least some of the first number of sets of event metadata indicative of an occurrence of respective ones of events which occur at the first remote location, the first number of sets of event metadata which represent aspects of the respective event without all of a number of digitized images on which identification of the occurrence of the event was based; store to the at least one non-transitory storage medium of the macro event persistent storage component a second number of sets of event metadata from a second video analysis system that monitors a second remote location remote from the macro event persistent storage component, at least some of the second number of sets of event metadata indicative of an occurrence of respective ones of events which occur at the second remote location, the second number of sets of event metadata which represent aspects of the respective event without all of a number of digitized images on which identification of the occurrence of the event was based; and execute at least a first query on information including both of at least one of the stored first number of sets of event metadata and at least one of the stored second number of sets of event metadata. At least one of the first remote location and the second remote location may be selected from the group consisting of: a retail location, a retail zone of the retail location, a sub-zone of the retail location, a loading zone of the retail location, a public zone of the retail location, and a constriction point between two zones of the retail location. The instructions may cause the at least one processor to execute the first query for at least one of: a traffic flow timeline report, an entrance flow timeline report, a zone flow timeline report, a queue depth timeline report, an object dwell timeline report, a face dwell timeline report, a demographics classification timeline report, a track map report, or a wait-time report. At least one of the sets of event metadata may be indicative of one of an occupancy of a zone, an individual transitioning between two zones, a set of demographic information for at least one individual, a dwell time of an individual in a region, a track map, or an estimation of a wait-time estimation.

The instructions may further cause the at least one processor to store a result of the first query to the at least one nontransitory storage medium of the macro event persistent storage component.

The instructions may further cause the at least one processor to execute at least a second query on information including the stored result of the first query.

A method of operating a video analytics system may be summarized as including monitoring a zone by a video analysis system for a period of time; determining a population of the zone by the video analysis system over the period of time; following the period of time, setting the population of the zone to an expected population of the zone at a defined time by at least one of the video analysis system or the video analytics system.

The method may further include determining an error corresponding to a difference between a population of the zone determined by the video analysis system at the defined time and the expected population of the zone at the defined time.

The method may further include determining a weighted error proportional to the determined error and a flow of individuals into and out of the zone; and adjusting the population of the zone as determined by the video analysis system over a series of sub-periods according to the weighted error. The period of time may be about 24 hours, the sub-period may be about an hour, the expected population of the zone may be zero individuals, and the zone may be a retail zone.

A video analytics system may be summarized as including at least one processor; and at least one non-transitory storage medium communicatively coupled to the at least one processor and which stores processor executable instructions which when executed by the at least one processor cause the at least one processor to: monitor a zone by a video analysis system for a period of time; determine a population of the zone by the video analysis system over the period of time; following the period of time, set the population of the zone to an expected population of the zone at a defined time.

The instructions may further cause the at least one processor to determine an error corresponding to a difference between a population of the zone determined by the video analysis system at the defined time and the expected population of the zone at the defined time.

The instructions may further cause the at least one processor to: determine a weighted error proportional to the determined error and a flow of individuals into and out of the zone; and adjust the population of the zone as determined by the video analysis system over a series of sub-periods according to the weighted error. The period of time may be about 24 hours, the sub-period may be about an hour, the expected population of the zone may be zero individuals, and the zone may be a retail zone.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with video analysis systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein and in the claims, the term "video" and variations thereof, refers to sequentially captured images or image data, without regard to any minimum frame rate, and without regard to any particular standards or protocols (e.g., NTSC, PAL, SECAM) or whether such includes specific control information (e.g., horizontal or vertical refresh signals). In many typical applications, the image capture rate may be very slow or low, such that smooth motion between sequential images is not discernable by the human eye.

The headings and Abstract of the Disclosure provided herein are for convenience only and do not interpret the scope or meaning of the embodiments.

Figure 1:
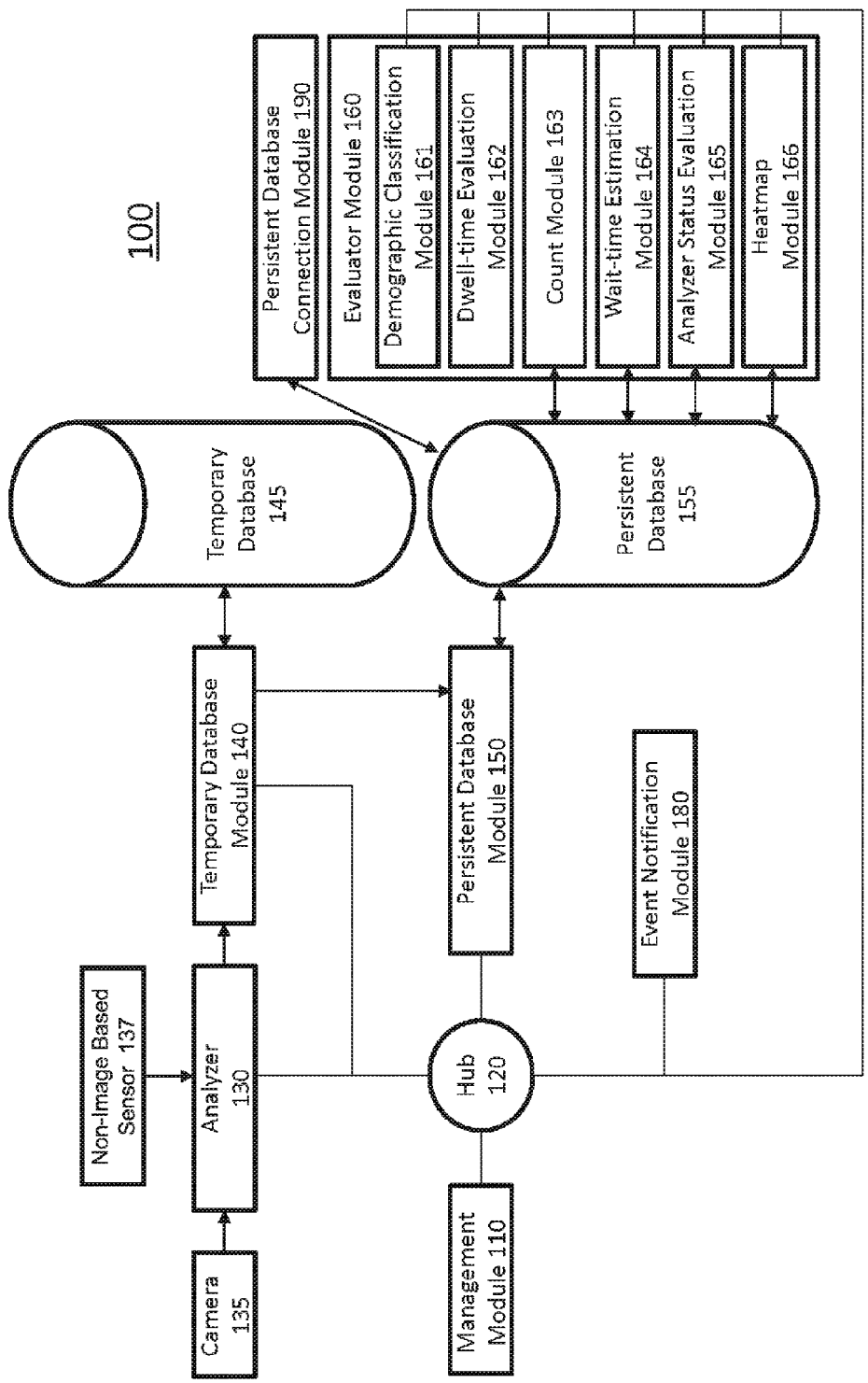
FIG. 1 is a schematic diagram of a video analysis system in accordance with an illustrated embodiment of the present systems and methods.

FIG. 1 shows a diagram of an embodiment of a video analysis system 100 suitable for running or automatically performing video analytics. A management module 110 may control the operation of video analysis system 100. A user of video analysis system 100 may interact (e.g., issue commands) with video analysis system 100 through management module 110. Management module 110 may control the flow of information through a hub 120. Hub 120 may be a central module or one of a number of control modules of video analysis system 100 through which information, videos and/or commands flow. Hub 120 may allow for communication between management module 110 and an analyzer 130, a temporary database module 140, a persistent database module 150, an evaluator dispatch module 160 and an event notification module 180. Persons of skill in the art would appreciate that additional components of video analysis system 100 may be in communication with management module 110 through hub 120 or an alternative communications channel.

An analyzer 130 may be connected to a camera 135. Camera 135 may monitor an area. Camera 135 may be an IP camera such that analyzer 130 and camera 135 operate on and communicatively connect to a network. Camera 135 may be connected directly to analyzer 130 through a universal serial bus (USB) connection, IEEE 1394 (Firewire) connection, or the like. Camera 135 may take a variety of other forms of image capture devices capable of capturing sequential images and providing image data or video. As used herein and in the claims, the term "camera" and variations thereof, means any device or transducer capable of acquiring or capturing an image of an area and producing image information from which the captured image can be visually reproduced on an appropriate device (e.g., liquid crystal display, plasma display, digital light processing display, cathode ray tube display).

The camera 135 may capture sequential images or video of an area. The camera 135 may send the images or video of the area to the analyzer 130 which then processes the images or video to determine occurrences of activity or interest. The area being imaged may be divided into regions. The analyzer 130 may process the images or video from camera 135, or various characteristics of objects (e.g., persons, packages, vehicles) which appear in the images. For example, the analyzer 130 may determine or detect the appearance or absence of an object, the speed of an object moving in the video, acceleration of an object moving in a video, and the like. The analyzer 130 may, for example, determine the rate at which a group of pixels in the video changes between frames. The analyzer 130 may employ various standard or conventional image processing techniques. Analyzer 130 may also identify a path an object takes within or through the area or sequential images. The analyzer 130 may determine whether an object moves between a first region of the area to a second region of the area or whether the object persists within the first region of the area. Further, analyzer 130 may process identifying characteristics of common objects, such as identifying characteristics of people's faces. All of the data created by analyzer 130 may be stored as event records or event metadata with the associated video captured by camera 135 or it may be stored as event records or event metadata in a separate location from a location of the video captured by camera 135. The terms event record and event metadata are used interchangeably herein and in the claims to refer to information which characterizes or describes events, the events typically being events that occur in the area to be monitored and which are automatically discernable by the analyzer 130 from one or more images of the area. Such information may include an event type, event location, event date and/or time, indication of presence, location, speed, acceleration, duration, path, demographic attribute or characteristic, etc.

One or more non-imaged based sensors 137 may detect, measure or otherwise sense information or events in an area or zone. For example, a non-imaged based sensor 137 in the form of an automatic data collection device such as a radio frequency identification (RFID) interrogator or reader may detect the passage of objects bearing RFID transponders or tags. Information regarding events, such as a passage of a transponder, and associated identifying data (e.g., unique identifier encoded in RFID transponder) may be provided to the analyzer 130. For example, employees may wear badges which include RFID transponders. The use of non-imaged based sensor(s) 137 may allow the analyzer 130 to distinguish employees from customer in a total occupancy count, allowing the number of customers to be accurately determined. Such may also allow the analyzer to assess the number or ratio of customers per unit area, the number or ration of employees per unit area, and/or the ratio of employees to customers for a given area or zone.

Events identified by analyzer 130 are used by video analysis system 100 to automatically complete real-time monitoring of an area under surveillance by camera 135. Events may include identification of a face or a face satisfying certain defined criteria. Events may include identification of movement of an object. Events may include determination of a speed of a moving object or that a speed of a moving object is above, at or below some defined threshold. Events may include determination of an acceleration of a moving object or that an acceleration of a moving object is above, at or below some defined threshold. Events may include identification of a stationary object. Events may include identification of a path along which an object moves or that such a path satisfied certain defined criteria (e.g., direction, location). Also, events may include identification of a certain defined operational state of cameras 135 by analyzer 130. There may exist a plurality of analyzers 130 within video analysis system 100. Analyzer 130 may be connected to two or more cameras 135. Further discussion of event identification can be found in U.S. Provisional Application No. 61/340,382, filed Mar. 17, 2010 and titled "Systems and methods for video analysis."

Analyzer 130 may operate in real-time, identifying events from image or video captured by camera 135. The memory available to analyzer 130 to store video may be such that less than several seconds or a limited number of images or frames may be analyzed at a single time. Also, analyzer 130 may not be aware of other analyzers within analysis system 100 and may therefore be incapable of identifying macro events which may be identified by analyzing multiple video streams.

The videos and/or event records or sets of event metadata may be provided from analyzer 130 to a temporary database module 140. Temporary database module 140 may be in communication with temporary database 145. Videos and event records or sets of event metadata sent from analyzer 130 may be stored within temporary database 145 for a period of time. For example, a single image from the video stream may be identified every hour and used as a representative thumbnail image of the video. These thumbnail images may be indexed by temporary database 145. Because video files are comparatively large, huge volumes of digital storage would be required to archive these video feeds. Digital storage media this size are not cost efficient to purchase and maintain. As such, temporary database module may overwrite video stored within temporary database 145 on a first in, first out (i.e., queue) basis to store video being recorded in real-time. While this may be necessary, information contained within the video may be lost without an efficient means of storing events as event records or sets of event metadata which occurred during various times in the video. Temporary database 145 may, for example, have a storage capacity sufficient to store video recorded by camera 130 for 5 to 10 days.

The analyzer 130 may create or generate event records or sets of event metadata for each event in the video identified by the analyzer 130. The analyzer 130 may provide the event records or sets of event metadata to a persistent database module 150 from which analyzer 130 may additionally or alternatively provide metadata regarding respective events to persistent database module 150. The event metadata may, for example, include an event type that identifies the type of event (e.g., linger, speed, customer count, employee count, population count, demographic, security), event location identifier, event time identifier, or other metadata that specifies characteristics or aspects of the particular event. Further, persistent database module 150 may pull event information from temporary database 145, via temporary database module 140. Event records or sets of event metadata are stored by persistent database module 150 in a persistent database 155. Event record or sets of event metadata file sizes are small in comparison to the file sizes of videos. Events may be identified and event records or sets of event metadata created by devices other than analyzer 130. For example, a door sensor signals to persistent database module 150 reporting events such as whether a door is open or closed. Persons of skill in the art would appreciate that many events detected, and event records or sets of event metadata, may be generated by devices that do not analyze images or video (i.e., non-analyzers). Persistent database 155 may have a storage capacity sufficient to store event records or sets of event metadata generated by analyzer 130 for the operational lifetime of video analysis system 100. Operational lifetimes of video analysis system may, for example, be on the order of 5 to 10 years or greater.

The video analysis system 100 may optionally include an evaluator module 160 to interface directly with persistent database 155. Evaluator module 160 may include a plurality of sub-evaluator modules such as a demographic classification module 161, a dwell-time evaluation module 162, a count module 163, a wait-time estimation module 164, an analyzer status evaluation module 165, and a heatmap module 166 which may implement track and/or dwell time heatmapping. Evaluator module 160 may be automatically started on detection of the occurrence of an event, for instance to evaluate whether or not the event actually occurred in response to a false alarm condition. Evaluator module 160 may operate on a schedule such that an evaluation occurs every minute. Evaluator module 160 may be started based on receipt of an event occurrence signal or event record received from analyzer 130. Evaluations performed by the evaluation modules 160 may create macro-event records or sets of macro-event metadata, which may be stored within persistent database 155 as respective macro-event records or sets of macro-event metadata.

Evaluation module 160 does not operate in real-time with video from camera 135. Rather, the evaluation module 160 evaluates information (e.g., event records, event metadata about an event) provided by the analyzer 130. Analyzer 130 provides real-time event identification from a video and the evaluation module 160 performs video analytics on the event data (e.g., event records, event metadata). The evaluation module 160 operates in near-real-time such that events identified by analyzer 130 are processed by evaluation module 160 in a timely manner once the event records or event metadata reach persistent database 155. An event may, for instance, be processed within a minute of the corresponding event record or event metadata being stored within persistent database 155. Some events may be processed after a longer period of time while other events may be processed within seconds of the corresponding event record or event metadata being stored within persistent database 155.

Figure 7:
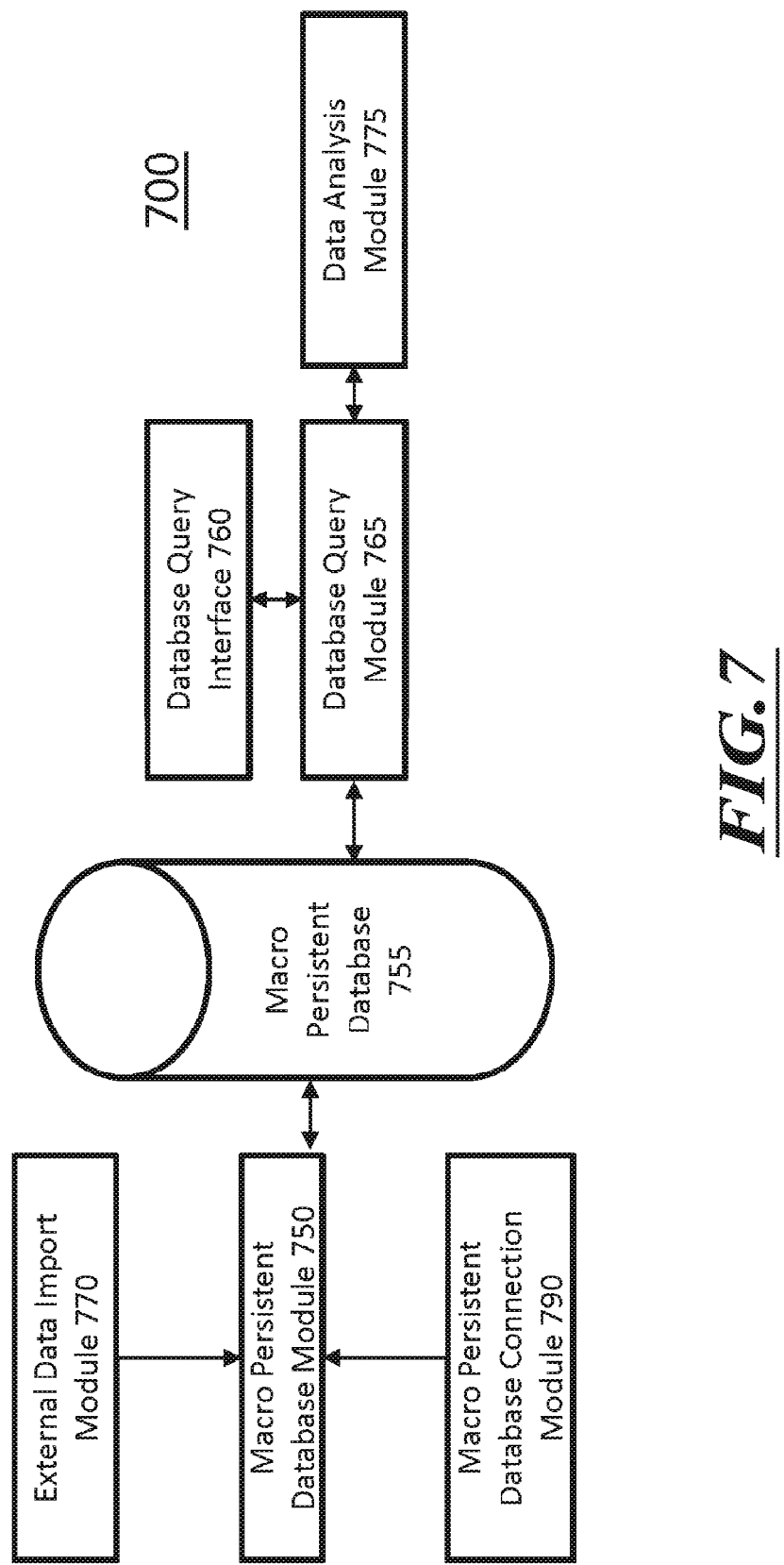
FIG. 7 is a schematic diagram of a video analysis system in accordance with an illustrated embodiment of the present systems and methods.

A database communication module 190 may be in communication with persistent database 155 and, optionally, one or more remote persistent database communication modules, such as a macro persistent database communication module 790 (as shown in FIG. 7). Information from persistent database 155 may be transmitted to the remote persistent database communication module through a computer network (e.g., the Internet, intranet, extranet, local area network, wide area network) or another communication structure capable of transmitting data between persistent database communication module 190 and a remote persistent database communication module. Event records and/or metadata created by analyzer 130 and evaluation module 160, stored within persistent database 155, may be transmitted over such a communication connection. The persistent database module 150 may transmit information from persistent database 150 to a remote persistent database communication module.

Event records and/or metadata corresponding to events, such as identification of an operational state of cameras 135, may be sent from analyzer 130 to an event notification module 180 and persistent database module 150. In response to identification of macro-events, evaluation module 160 may send a signal indicative of such to event notification module 180. In response, event notification module 180 may generate and send or cause to be sent emails, text messages, or other notices or alerts through a network or other communications connection to receivers external to video analysis system 100.

Figure 2:
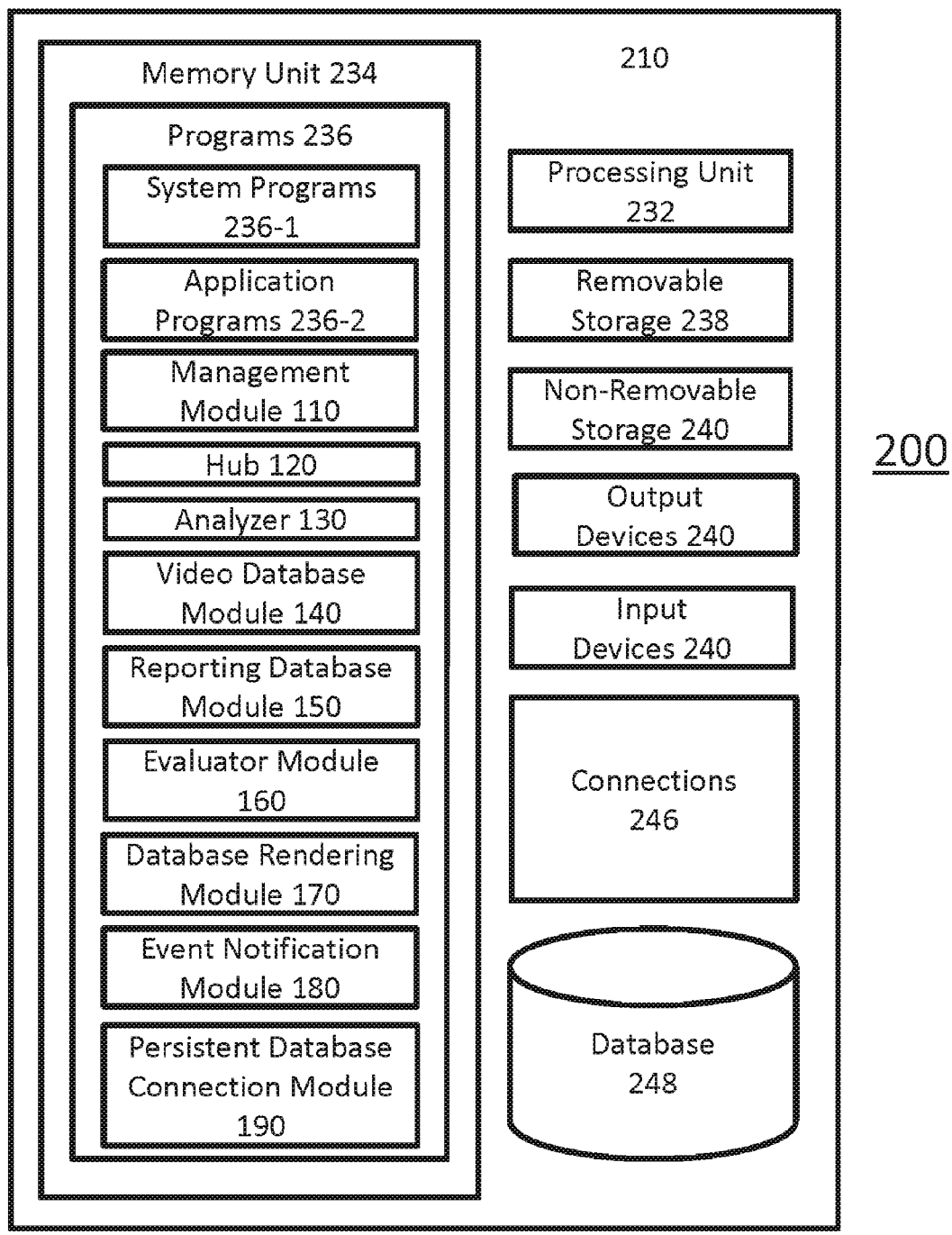
FIG. 2 is a schematic diagram of a computing system that forms a component of the video analysis system of FIG. 1 in accordance with an illustrated embodiment of the present systems and methods.

FIG. 2 illustrates a computing architecture 200 suitable for implementing one or more of the components of video analysis system 100. In a basic configuration, computing architecture 200 includes at least one computing system 210 which typically includes at least one processing unit 232 and memory 234. The at least one processing unit or processor 232 may take any of a variety of forms, for example, a microprocessor, digital signal processor (DSP), programmable gate array (PGA) or application specific integrated circuit (ASIC). Memory 234 may be implemented using any non-transitory processor-readable or computer-readable media capable of storing processor executable instructions and/or data, including both volatile and non-volatile memory. For example, memory 234 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of non-transitory storage media suitable for storing information. As shown in FIG. 2, memory 234 may store various software programs 236 and accompanying data. Depending on the implementation, examples of software programs 236 may include one or more system programs 236-1 (e.g., an operating system), application programs 236-2 (e.g., a Web browser), management modules 110, hubs 120, analyzers 130, video or temporary database modules 140, reporting or persistent database modules 150, evaluator modules 160, event notification modules 180, persistent database connection modules 190 and so forth.

Computing system 210 may also have additional features and/or functionality beyond its basic configuration. For example, computing system 210 may include removable storage media drive 238 operable to read and/or write removable non-transitory storage medium and non-removable storage media drive 240 operable to read and/or write to non-removable non-transitory storage media. Various types of processor-readable or computer-readable media have previously been described. Computing system 210 may also have one or more input devices 244 such as a keyboard, mouse, pen, voice input device, touch input device, measurement devices, sensors, and so forth. Computing system 210 may also include one or more output devices 242, such as displays, speakers, printers, and so forth.

Computing system 210 may further include one or more communications connections 246 that allow computing system 210 to communicate with other devices. Communications connections 246 may give event notification module 180 and persistent database connection module 190 accesses to the Internet or other networked and/or non-networked resources. Communications connections 246 may take the form of one or more ports or cords for wired and/or wireless communications using electrical, optical or radio (RF and/or microwave) signals. Evaluator module 160 may access communication connections 246 directly. Further, camera 135 (e.g., IP camera) may be connected to computing system 210 through communication connections 246. Analyzer 130 may be connected to computing system 210 through communication connections 246. Communication connections 246 may connect additional sensors such as motion detectors, door and window opening sensors, and the like to communicate with computing system 210. Communications connections 246 may include various types of standard communication elements, such as one or more communications interfaces, network interfaces, network interface cards (NIC), radios, wireless transmitters/receivers (transceivers), physical connectors, USB connections, IEEE 1394 connections, cellular data network equipment, and so forth.

Computing system 210 may further include one or more databases 248, which may be implemented in various types of processor-readable or computer-readable media as previously described. Database 248 may include temporary database 145 and persistent database 155. Each temporary database 145 and persistent database 155 may exist on different non-transitory storage media, on two or more partitions of a single non-transitory storage media source.

Event records and/or metadata generated by analyzer 130 are used by video analysis system 100 to complete real-time monitoring of an area monitored by one or more cameras 135. Event records and/or event metadata may be stored in persistent database 155. Evaluator module 160 may interact with the sorted event records and/or event metadata to determine characteristics of events associated with or occurring in the area monitored by camera 135.

Figure 3:
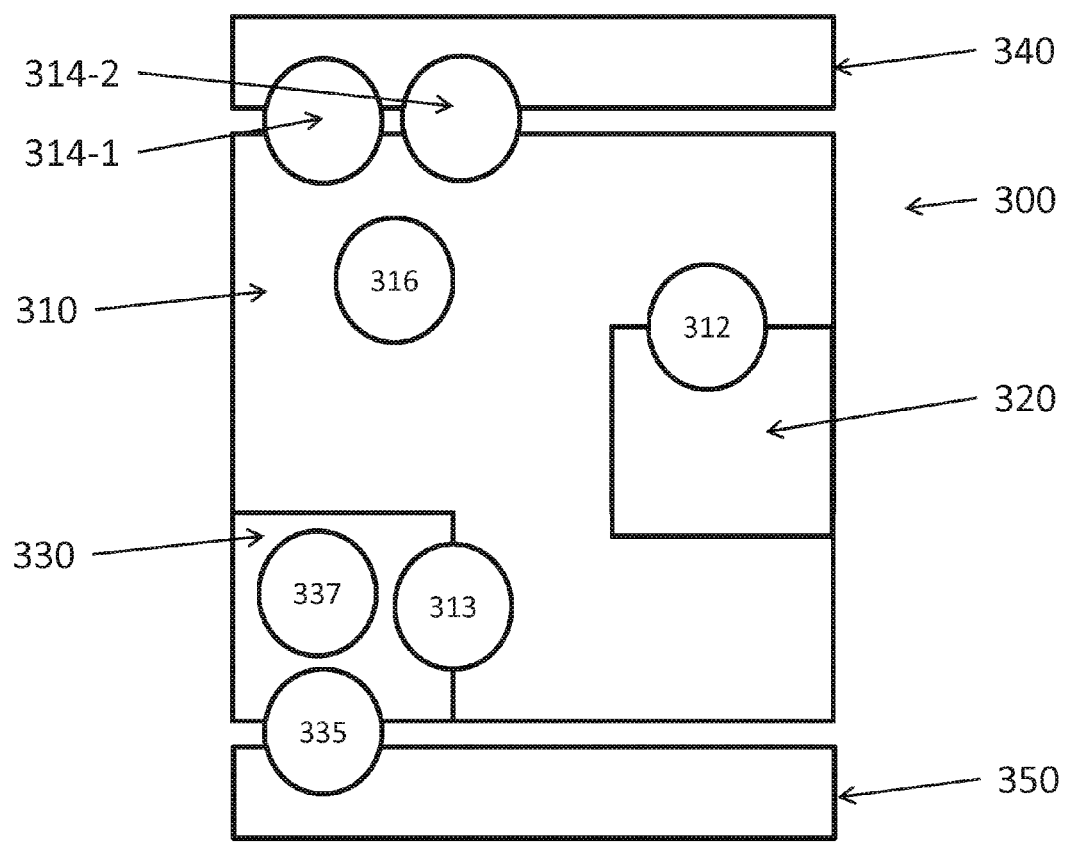
FIG. 3 is a schematic diagram of a retail location monitored by a video analysis system in accordance with an illustrated embodiment of the present systems and methods.

FIG. 3 shows a retail location 300 monitored by a video analysis system 100. Retail location 300 may have a retail zone 310 having a sub-zone 320 of retail zone 310. Sub-zone 320 may sell a number of specialty products sold exclusively within sub-zone 320. Sub-zone 320 may be defined by one or more constriction points through which individuals must pass to enter or exit sub-zone 320. The retail location 300 may, for example, include a loading zone 330. The loading zone 330 may also have well defined constriction locations through which individuals enter and exit loading zone 330.

The flow of people or other object retail location 300 may be of interest. Customers flowing into and out of retail zone 310 from a public zone 340 or another retail zone through doors or other areas being monitored by video acquisition systems 314-1 and 314-2 may be identified as events by video acquisition systems 314-1 and 314-2 and sent to persistent database for analysis. Video acquisition systems 314-1 and 314-2 may, for example, include a pair of cameras 135 and associated analyzers 140. Existing video acquisition equipment installation may be employed, such as those commonly used to provide surveillance and/or security in retail and other locations. In some embodiments of the present systems and methods there may exist a single analyzer 130 receiving information from both a first camera 135 of video acquisition system 314-1 and a second camera 135 of video acquisition system 314-2, or there may a respective analyzer 130 connected to each respective camera 135 of video acquisition systems 314-1 and 314-2.

Once inside the store, images of customers may be recorded by a video acquisition system 316. Video acquisition system 316 may record images of the customer faces for demographic identification for demographic identification and the behavior of individuals for dwell time calculations, and other video analytics analysis.

In some embodiments, specialty products may be sold exclusively within sub-zone 320. Sub-zone 320 may not be defined by a single exit and entrance point. Rather sub-zone 320 may just be an area of retail zone 310 which carries specialty products and which customers can freely walk into and out of.

One or more video acquisition systems 312 may be positioned to monitor the flow of people and/or other objects between sub-zone 320 and retail zone 310. Additional video analytic techniques may be conducted on images of people within sub-zone 320 by video acquisition system 312 or by an additional video acquisition system covering all or a portion of sub zone 320.

A video acquisition system 313 may, for example, monitor the flow of people and/or other objects between loading zone 330 and retail zone 310. A video acquisition system 335 may, for example, monitor the flow of people and/or other objects between loading zone 330 and public zone 350. Additional video analytic techniques may be conducted on images of people in loading zone 330 by a video acquisition system 337. The dwell or linger time of people in loading zone 330 may be monitored closely to prevent theft of merchandise, to ensure adequate staffing levels, and/or to insure employees in loading zone 330 are working efficiently.

Figure 4A:
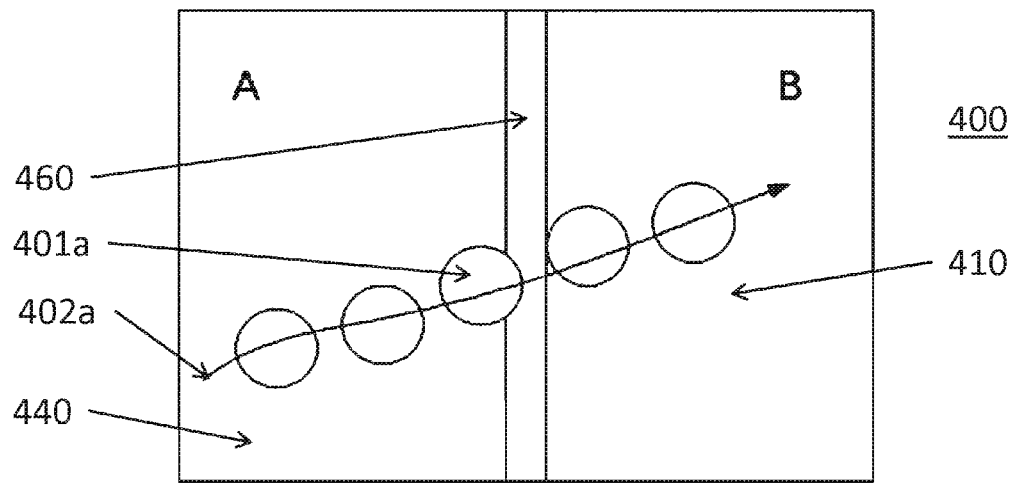
FIGS. 4A to 4E are exemplary images of an area captured by at least one video acquisition system which are processed by a video analysis system in accordance with an illustrated embodiment of the present systems and methods.

FIG. 4A shows an entrance area 400 to retail zone 310 (FIG. 3) from a public zone 340 (FIG. 3) which may be monitored by one of video acquisition systems 314-1 and 314-2 (FIG. 3). The analyzer 130 may recognize customers flowing into and out of retail region 410 of retail zone 310 from a public region 440 of public zone 340 through transition region 460 as events, and may create corresponding event records and/or event metadata indicative of and/or describing aspects of these activities.

When the analyzer 130 detects the presence of an individual 401a in entrance area 400, the path of the individual in the video sequence is computationally monitored by analyzer 130. FIG. 4A shows an individual 401a (represented as circles) at successive intervals of time walking from public region 440, through transition region 460 and into retail region 410. In response, an event records and/or event metadata may be automatically generated by analyzer 130 representing or indicative of an individual entering retail region 410 from public region 440.

The analyzer 130 may determine a track 402a corresponding to a movement of individual 401a in a series of images to determine the flow of the individual 401a. The analyzer 130 may use the track to determine whether individual 401a briefly transitions between two regions of interest only to return to the starting location or original region and exit area 400. The analyzer 130 may additionally, or alternatively, determine an amount of time that the individual spends in a given region or area.

Figure 4B:
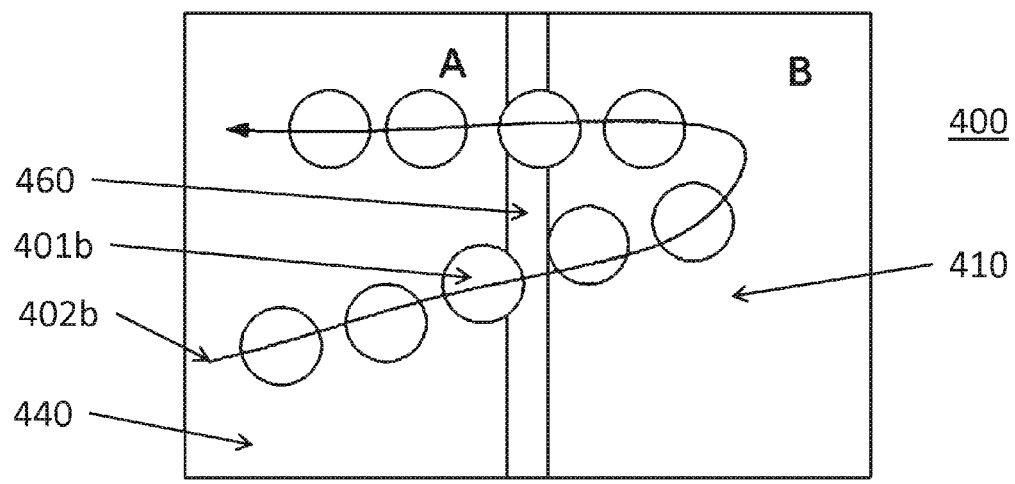

FIG. 4B shows such a situation where an individual 401b enters area 400 from public region 440 and leaves area 400 from public region 440. Analyzer 130 may be configured so as to not create an event record or event metadata corresponding to individual 401b entering retail zone 310 for later analysis by video analysis system 100 since track 402b only briefly enters retail region 410 to leave via public region 440.

Figure 4C:
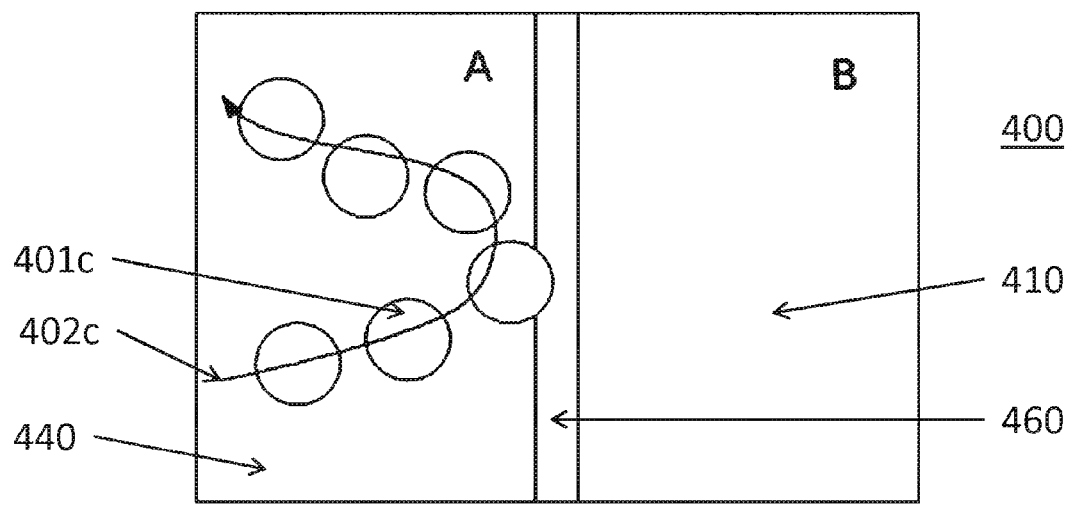

Similarly, for the embodiment shown in FIG. 4C, individual 401c does not enter retail region 410, but rather is seen entering public region 440 and leaving public region 440 along track 402c. Analyzer 130 may not generate an event corresponding to individual 401c since individual 401c moving along track 402c did not enter retail zone 310.

Thus, the analyzer 130 may be configured or programmed to perform image processing on a sequence of images or video, identify objects in those images, recognize certain activities as events, determine which events satisfy certain criteria and are thus of interest, and generate or create event records or event metadata which characterizes the events of interest in a more compact form than the raw video or images.

Figure 4D:
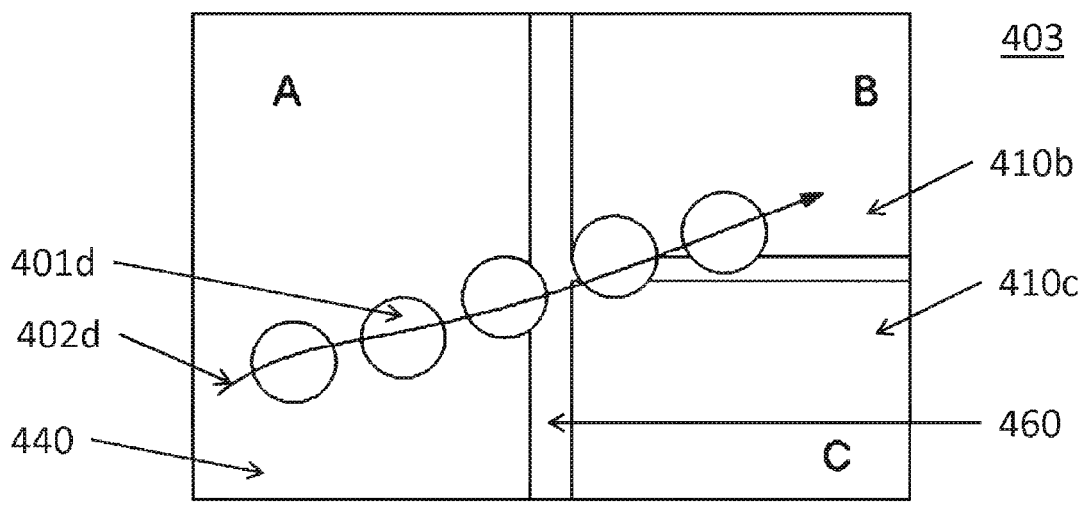
Figure 4E:
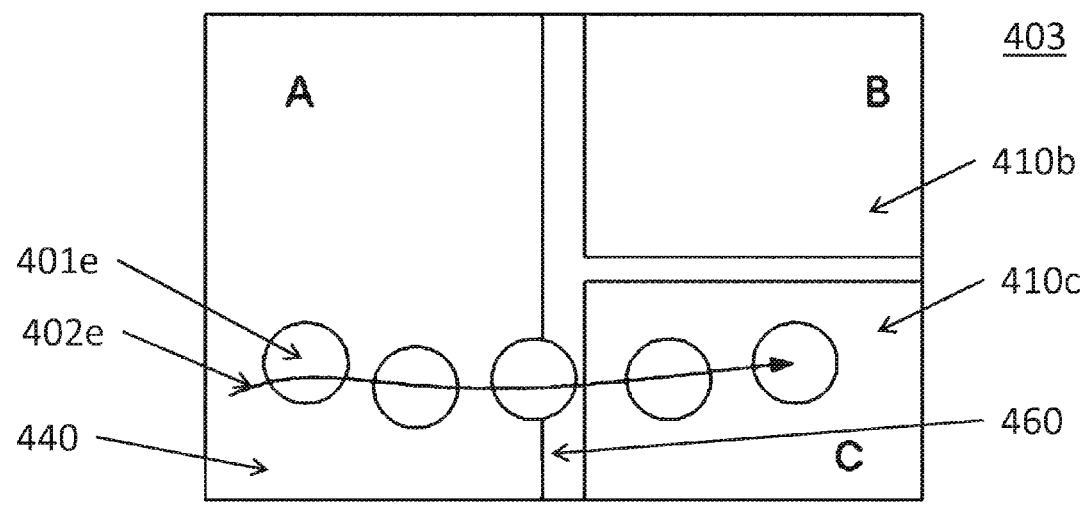

FIGS. 4D and 4E show an image of an entrance area 403 to retail zone 310 from a public zone 340 which may be monitored by one or more of video acquisition systems 314-1 and 314-2. The monitoring of area 403 may include determining a direction individuals 401d and 401e take when entering retail zone 310 and recording such. Should an individual 401*d* enter retail zone 310 by, for example, going left after entering retail zone 310 (see FIG. 4D), the analyzer 130 may recognize such as an event of interest and may generate a corresponding event record or event metadata. That event record or event metadata may be distinct from an event record or event metadata generated by the analyzer 130 in response to an individual 401*e* entering retail zone 310 and, for example, veering to the right (see FIG. 4E). Directions other than left or right (in the image) may additionally or alternatively give rise to other distinct event records or event metadata. Further, the direction from which individuals exit retail zone 310 may be monitored or analyzed, as can be whether individuals walk along the transition area between retail zone 310 and public zone 340. Event records may include an event type field or value which identifies the type of event which the analyzer 130 detected. For example, different event types may indicate a left turn, a right turn, a dwell or linger time above some defined threshold, a speed or acceleration above some defined threshold. Event records and/or event metadata may specify additional information characterizing the event, for example, date, time, location, gender, age, ethnicity.

In response to customers flowing into and out of retail regions 410*b* and 410*c* of retail zone 310 from a public region 440 of public zone 340 through transition region 460 the analyzer 130 may create corresponding event records or event metadata to the actions, indicative of the respective tracks 402*d* (of FIG. 4D) and 402*e* (of FIG. 4E).

As shown in FIG. 4D, when the analyzer 130 identifies an individual 401*d* in entrance area 403, the analyzer 130 may monitor the path 402*d* of the individual 410*d* over some time. FIG. 4D shows an image of an individual 401*d* walking from public region 440, through transition region 460 and into retail region 410*b*. In response, the analyzer 130 may generate an event record or event metadata representing the individual entering retail region 410*b* from public region 440.

As shown in FIG. 4E, when the analyzer 130 identifies that an individual 401*e* is in entrance area 403, analyzer 130 may monitor the path 402*e* of the individual 401*e* over some period of time. FIG. 4E shows an image in which an individual 401*e* walks from public region 440, through transition region 460 and into retail region 410*c*. In response, the analyzer 130 may generate an event record and/or event metadata representing an individual entering retail region 410*c* from public region 440.

Similarly, the analyzer 130 may generates an event in response to detecting individuals entering area 403 from retail region 410*b* or exiting area 403 from retail region 410*b* to public region 440. In response to detecting individuals entering area 403 from retail region 410*c* then exiting area 403 from retail region 410*c* to public region 440, the analyzer 130 may generate a corresponding event record and/or event metadata. An exit event record and/or event type may be generated in response to detecting when an individual transitions from a region within retail zone 310 to a region within public zone 340.

Stores may sell different products in different regions portions or areas of their respective retail zones 310. With retail regions 410*b* and 410*c*, retail monitoring may be automatically conducted by the video analysis system 100 to determine which areas of retail zone 310 have more traffic from individuals entering retail zone 310 from public zone 340. This information may allow for redesigns or redistribution of merchandise to maximize the exposure of certain products to individuals within retail zone 310. The video analysis system 100 may generate reports summarizing the flow of individuals into different areas of the store, such as region 410*b* versus region 410*c*.

The information defining or characterizing relationships (e.g., geographic, product type) between regions 410, or 410*b* and 401*c*, and 440 may be stored within persistent database 155. Groups of video acquisition systems having physically adjacent or even overlapping fields of view may be combined to create a virtual "entrance" or passageway. Groups of entrances, such as area 400 and similar areas, are combined to account for or define the region perimeter. Depending on the type of query that is requested or provided by the user, reports may be automatically generated by one or more analyzers, for one or more single entrances, each having associated multiple or single analyzers, or all entrances/analyzers that make up or form the perimeter.

Count module 163 may operate based, at least in part, on events generated by analyzer 130. Those events may represent the entrance and exit of individuals from retail zone 310, such as those events generated by the movements of individuals 401 in the images represented in FIGS. 4A, 4D and 4E. By automatically examining when and/or where an individual enters and exits the store through any entrance or "virtual entrance" to retail zone 310 the system may update an occupancy number. Such occupancy statistics may be of interest to managers of retail location 300. Video analysis system 100 may be capable of determining or monitoring the occupancy of retail zone 310 throughout the day. Such may reflect a customer count representing a total number of customers present in an area or zone, an employee count representing a total number of employees present in an area or zone, and/or a population count representing a total population of an area or zone.

Such occupancy statistics may not be entirely accurate due to the occurrence of individuals entering or leaving the store not being detected or identified in the image or when an analyzer 130 creates an event for an individual entering or leaving the store when none such occurrence happened. An initialization or zeroing process may be optionally performed to ensure such statistics are as accurate as possible. For example, the occupancy of retail zone may be assumed to be zero at some time during the night, for instance 2 AM.

However, in use the occupancy count generated by count module 163 may not be zero at 2 AM when initializing or zeroing occurs. Thus, the determined value of occupancy count at 2 AM may be determined and all values of occupancy count generated throughout the day prior may be adjusted by a weighted error value of the occupancy error. For instance, the correction applied to an occupancy of 100 individuals, as calculated before adjustment of the occupancy error, may be larger than when an occupancy of 10 individuals is calculated. A day (e.g., 24 hours) may be a standard period of time for calculation of the occupancy error. A correction of the calculation of the occupancy level may be done for each sub-period (e.g., hour) of the 24-hour period. For each sub-period of the day, the occupancy calculated may be adjusted by the weighted error value. The occupancy correction values may be positive or negative values. When the store opens for business, the occupancy of the store may be set to zero. Further, the occupancy of the store's employees may be accounted for in the occupancy values calculated by count module 163.

Figure 5:
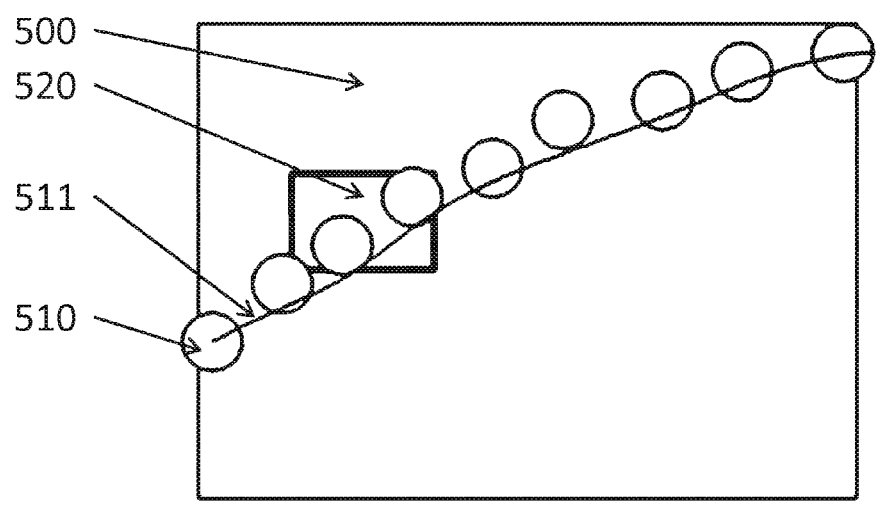
FIG. 5 is an exemplary image of an area captured by at least one video acquisition system which is processed by a video analysis system in accordance with an illustrated embodiment of the present systems and methods.

FIG. 5 shows such an area 500 of retail zone 310 (FIG. 3). Video acquisition system 313 (FIG. 3) may acquire video of area 500 over a period of time, and analyzer 130 may process the acquired video to identify events. The analyzer 130 may identify and track an object 510 moving into a region 520. As illustrated, object 510 enters region 520 and exits back to area 500 along path 511. The analyzer 130 may create an event record or event metadata when object 510 is identified in region 520.

A dwell-time evaluation module 162 may be used to determine how long object 510 dwelled or lingered in region 520. The dwell-time evaluation module 162 may examine the event records and/or event metadata created by video acquisition system 312 and stored in persistent database 155. Noting the time object 510 was identified within region 520 along with the velocity and acceleration of object 510, some or all of which information may be stored in the event records or event metadata, an amount of time spent by object 510 within region 520 may be determined by dwell-time evaluation module 162. Dwell-time evaluation module 162 may store the dwell-time of object 510 in region 520 as a macro event record or metadata in persistent database 155.

This information is not easily determined without the creation of event records or event metadata such as the identification of an object within region 520. Video acquisition system 312 may not be able to hold or store more than a few seconds of video data at one time. The evaluation modules may needed to examine the events created by video acquisition system 312 over periods of time, for example, to determine dwell-time of an object within a region. The event records and/or metadata make it possible to report and compare the amount of time customers are within region 520. The event records and/or metadata also make it possible to report and compare relative success different stores have at attracting customers to respective regions 520. With such information, decisions can be made regarding staffing levels, product distribution, and other business related matters.

Figure 6:
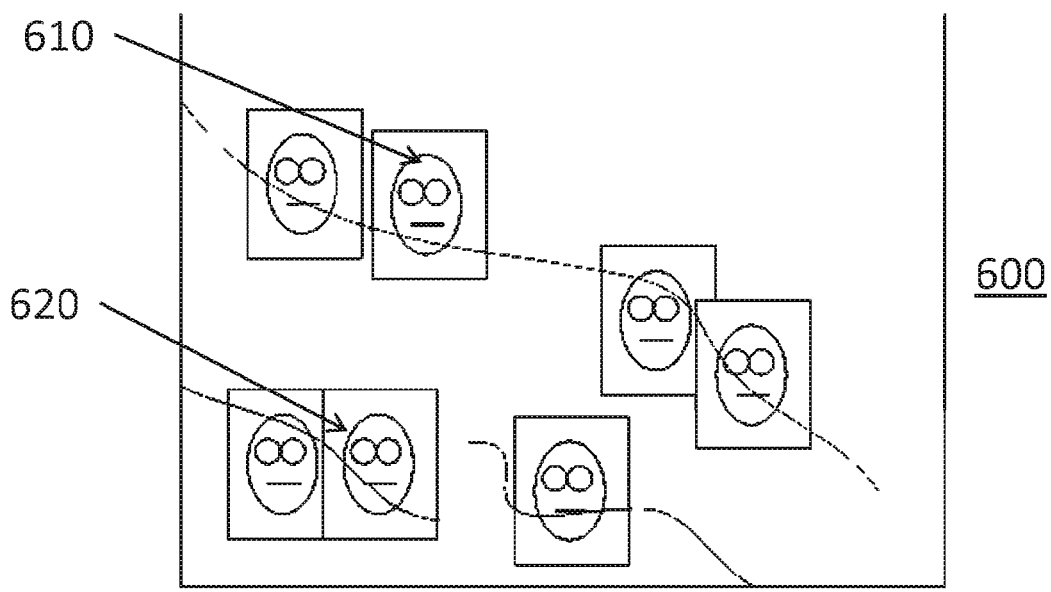
FIG. 6 is an exemplary image of an area including faces captured by at least one video acquisition system which is processed by a video analysis in accordance with an illustrated embodiment of the present systems and methods.

FIG. 6 shows an image of area 600, such as the entrance of retail location 300. Customers enter and leave or flow into retail zone 310 from a public zone 340 or some other zone or area through doors monitored by video acquisition systems 314-1 and 314-2. A video acquisition system 316 may acquire or capture images of customers and others in a store or other location. Video acquisition system 316 may record images in which individuals may be counted and/or tracked but not specifically identified. Alternatively, video acquisition system 316 may record images of the customer faces 610, 620, for example, as customers enter the store, area or zone for demographic identification. An analyzer 130 may use video taken of area 600 over a period of time by video acquisition system 316 to identify events and may transmit this processed or partially processed information to additional components of video analysis system 100 for analysis or post-processing.

Face detection may be performed using any of a number of suitable conventional algorithms. Many algorithms implement face-detection as a binary pattern-classification task. That is, the content of a given part of a frame of a video may be transformed into features, after which a classifier within analyzer 130, trained on example faces, decides whether that particular region of the image is a face, or not. The analyzer 130 can identify regions of an image or frame of video which may be a face. The face in an image or frame of video has intrinsic properties and metrics. The ratios of the distances between the eyes, nose and mouth have information that can be used to determine the gender of an individual, their age and ethnicity. A demographic classification evaluator 161 may be used to confirm the identification of the face and identify further demographic characteristics of the face. These metrics may be identified as an event and stored as an event record or event data in persistent database 155 by demographic classification evaluator 161 including information specifying a location of the face and where the face moves in time as determined by analyzer 130. Advantageously, with such small amounts of information representing the events in the video, remote connections to video analysis system 100 do not require high speed broadband to deliver high volumes of information.

In some embodiments, the video analysis system 100 may generate demographic information regarding the population of individuals within retail zone 310. With such information, advertisements display within the store, for instance on television sets or on advertisement walls, may be customized to the demographics identified. For instance, should video analysis system 100 determine more females are in the store than males, advertising specifically targeted to a female demographic may be shown preferentially over advertising used to target male customers. The customization may be performed automatically by the video analysis system 100 or some communicatively associated system, or may be performed manually by individuals. For instance, a number of prerecorded advertisements may be stored along or associated with information that identifies suitable targeted demographics for the respectively advertisements. The video analysis system 100 or some other communicatively associated computing system may search the information, for instance stored in a database, for advertisements targeted to the particular demographic of one or more individuals represented in the captured and analyzed images.

Figure 9:
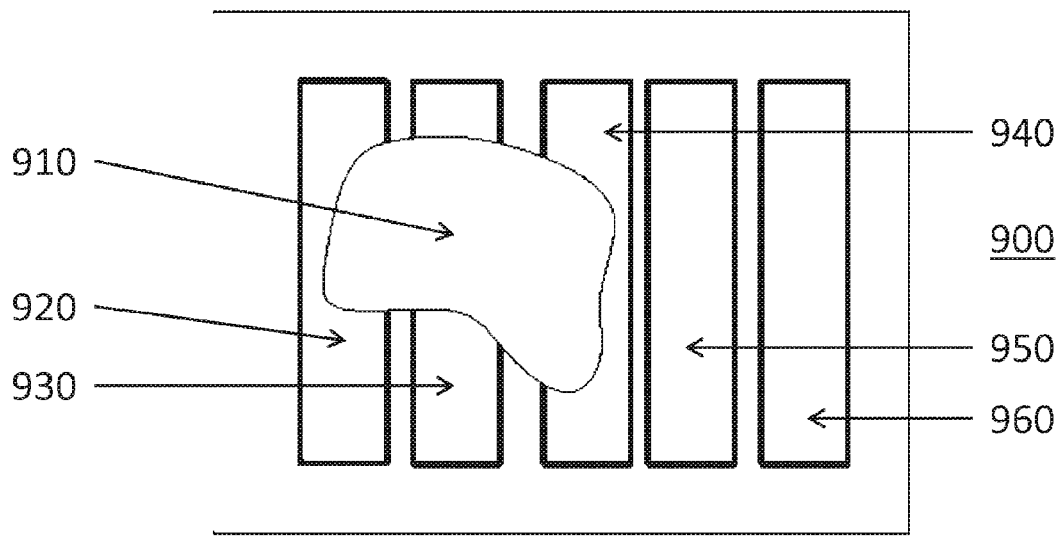
FIG. 9 is an exemplary image of an area captured by at least one video acquisition system which is processed by a video analysis system in accordance with an illustrated embodiment of the present systems and methods.

FIG. 9 shows an image of a queuing zone 900 of a retail location 310. Queuing zone 900 may be physically or virtually divided or partitioned into a number of areas, for example, an area 920, area 930, area 940, area 950 and area 960. A sequence of images or video of each area 920, 930, 940, 950 and 960 is acquired over a period of time by one or more cameras 135, for example, by a respective camera 135 or video acquisition system 316. An analyzer 130 may detect or identify an object 910 in the images or video. Object 910 may be representative of activity or events occurring in areas 920, 930 and 940. The analyzer 130 may generate or create or move event records or event metadata in response to detecting or identifying objects in images and/or ascertaining whether those objects satisfy certain criteria (e.g., location, speed, acceleration, quantity or total, demographic traits).

A wait-time estimation module 164 may determine a queue wait-time (i.e., actual, average or median time for an individual to move through a queue or line). Wait-time estimation module 164 interacts with persistent database 155 to determine which areas have reported activity. The analyzer(s) associated with the five video acquisition systems may be able to determine that a queue extends through areas 920, 930 and 940 but an end of the queue has not reached or entered areas 950 or 960. By knowing historical data associated with queues in the queuing zone, an estimate of the waiting time for the queuing zone can be determined by wait-time estimation module 164. The wait-time estimation module 164 may report the determined wait time through event notification module 180, for example, for displaying via a sign so individuals entering queuing zone 900 are given an estimate of their wait-time.

Historical data may be generated by video analysis system 100 and stored in persistent database 155. The wait-time estimation module 164 may create or generate a macro event record or metadata in response to a queue of a given size decreasing over a given period without any additional influx of people. Over time, the video analysis system 100 learns how to estimate wait-times more accurately, based on the macro-event records or macro event metadata stored within persistent database 155.

In some embodiments, one individual camera 135 may not be sufficient to provide complete coverage of queuing region 900 in order to assess the amount of activity therein. Therefore, multiple cameras may be employed to monitor queuing region 900. Event records and/or event metadata created through this multi-camera monitoring should be examined as a whole by the video analysis system 100. For instance, a large amount of activity may be found in area 960 with little activity in one or more other regions. This may signify an influx of people into a queuing region with a short queue. A large amount of activity found in area 920 with little activity in any other region may signify a queue which is long enough to exist in 920 but not in any other region. This queue would have a relatively short wait-time as compared to a queue which has activity found in areas 920, 930 and 940, as shown in FIG. 9. Persistent database 155 and event records and/or event metadata from individual cameras facilitate the creation of macro-events through the implementation of wait-time evaluator module 164.

The video analysis system 100 may optionally include one or more analyzer status evaluation modules 165 configured to to determine an operational state or condition of the analyzer (s) 130, for example, whether the analyzer 130 is functioning properly. Analyzer status evaluation module 165 may execute periodically. Analyzer status evaluation module 165 may merely access persistent database 155 after a period of time to determine whether or not event records and/or event metadata are being generated by analyzer 130. Should a sufficiently long time (e.g., threshold time) pass without the generation of an event records or event metadata, or should a sufficiently large number (e.g., threshold quantity) of event records or event metadata be generated over a short period of time, the analyzer status evaluation module 165 may generate a macro-event record and/or macro-event metadata, alerting event notification module 180 of the aberrant condition or behavior of analyzer 130. Monitoring by the analyzer status evaluation module 165 may be suspended or a threshold parameter or conditions automatically adjusted to account for normal or typical traffic patterns. For instance, few or no event records or event metadata would be expected to be generated at night or during hours when a retail location is closed or not open for business. The status of analyzer 130 in video analysis system 100 advantageously allows a determination of whether information reported by video analysis system is accurate or whether component instability is affecting the reporting of video analysis system 100.

Analyzer status module 165 may also create event records or event metadata specifying or indicative of the periods of time for which analyzer 130 is active and the video source is acceptable for reporting. Should images captured by camera 135 be unacceptable for identification of events, such as when an analog camera is disconnected, a blue image may be transmitted to the analyzer 130, video analysis system 100 must be notified. While this may be a valid stream of video and undetected by the analyzer 130, the content is invalid. Analyzer status evaluation module 165 may be capable of determining whether the video stream being analyzed by analyzer 130 is sufficient for determination identification or recognition of events in the area the analyzer 130 monitors.

Figure 10A:
FIG. 10A is an exemplary black and white photograph of a track "heatmap" of an area captured by at least one video acquisition system in accordance with an illustrated embodiment of the present systems and methods.
Figure 10B:
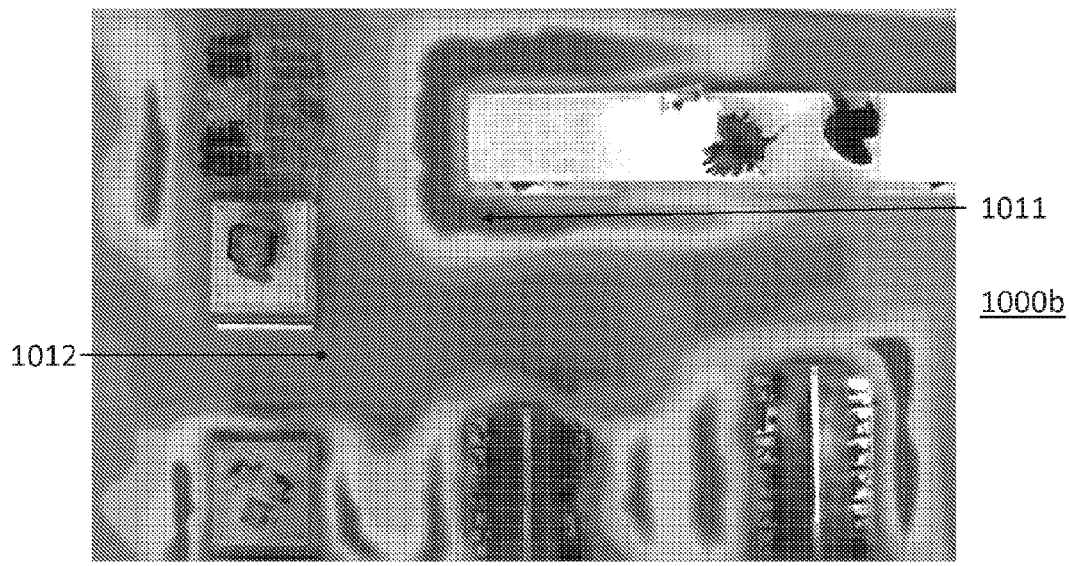
FIG. 10B is an exemplary black and white photograph of a dwell "heatmap" captured by at least one video acquisition system in accordance with an illustrated embodiment of the present systems and methods.

FIG. 10A is an image illustrating a track "heatmap" in a commercial location. FIG. 10B is an image illustrating a dwell heatmap in a commercial location. A heatmap is a graphical representation of data where measured or otherwise determined values of a variable indicative of use (e.g., frequency of passage, dwell time) in a two-dimensional area are represented in a map format as colors or shades of grey. Such may be overlaid on a captured image or video frame of the two-dimensional area. In FIGS. 10A and 10B, dark grey is indicative of relatively "hot" or frequently traveled spots or locations whereas light grey is indicative of relatively "cold" or infrequently traveled spots or locations. Analyzer 130 may identity tracks of objects moving in area 1000a or 1000b and where these objects dwell or linger in area 1000a or 1000b from the images or video acquired or captured by camera 135. Event records and/or event metadata representing the track information may be stored within persistent database 155. As used herein and in the claims, the term "heatmap" and variations thereof such as map corresponds to such a mapped representation of use (e.g., frequency of passage, dwell time) of an area or portion thereof represented in two or more colors or shades (e.g., shades of grey scale). Typically, the variable employed in generating such will be indicative of frequency of use or passage, but may not be indicative of any actually measured heat or thermal characteristic. Although, in some environments, the variable may actually be a measured heat or thermal characteristic, for example, where infrared sensitive cameras are employed. When using thermal imaging, relatively hot spots or locations are typically indicative of a presence of a relatively larger number of people, and hence a spot or location of frequent use. Relatively cold spots or locations are typically indicative of an absence of large numbers of people, and hence a sport location of infrequent use. Heatmap module 166 may be executed once track information and dwell or linger times of objects moving in area 1000a or 1000b are available within persistent database 155.

Heatmap module 166 may be capable of producing track heatmaps, as seen in FIG. 10A, and dwell or linger heatmaps, as seen in FIG. 10B. While illustrated as a single module, separate track and dwell heatmap modules may be employed.

In particular, FIG. 10A shows the path people have taken in the field of view of camera 135 ignoring how long or the amount of time these people took to travel the path or how long they stayed or lingered at any particular spot. Dark grey indicates a frequently travelled path whereas light grey indicates a path infrequently or rarely travelled. Non-colored spots or locations, or spots or locations which still show the captured camera image, indicate that nobody walks in these areas of the region. Heatmap 166 may produce track heatmaps by examining a plurality of tracks such as paths 402a, 402b and 402c of FIGS. 4A, 4B and 4C respectively and summarizing this information. For example, heatmap module 166 may assign colors based on frequency of use to the various sports or locations. For instance, regions of area 1000a may be assigned a relatively darker color or shade where many paths or tracks have occurred, such as region 1001. Areas where no or relatively few tracks have occurred may be assigned a relatively lighter color or shade or even be uncolored (e.g., white), such as region 1002.

In particular, FIG. 10B shows the areas where people have lingered (e.g., spent a relatively long time in one place sampled at second intervals) in the field of view of camera 135. Dark grey indicates spots or locations where people have lingered (dwelled) a long time whereas light grey indicates areas where people rarely or infrequently linger. Non-colored sports or locations (e.g., white), or spots or locations which still show the camera image, may indicate nobody has spent any time in that area. Dwell or linger heatmaps may be produced. Heatmap module 166 may produce dwell or linger heatmaps by examining a plurality of tracks, such as path 511 and paths similar to path 511 (FIG. 5), and summarizing this information. For example, heatmap module 166 may assign colors or shades based on length and/or frequency of occupancy of a spot or location. For instance, regions of area 1000b may be assigned a relatively darker color or shade where dwelling by people has occurred, such as region 1011, while areas where no dwelling by people has occurred may be assigned a relatively lighter color or shade (e.g., white), such as region 1012.

The track and dwell heatmaps are not mutually exclusive. For example, a map or visual representation may have areas with high traffic indicated in dark grey (i.e., track heatmap) coincide with areas where people tend to stand for a long time, also indicated in dark gray (i.e., dwell heatmap).

Video analytics information regarding activity or events in respective retail locations 310 may be compiled across a chain of retail locations. With such information, further analysis of the chain of stores can be conducted, and decisions can be made regarding staffing levels, product distribution, and other business related matters providing a highly detailed analytic report of the chain of stores or retail locations.

FIG. 7 shows a macro video analysis system 700. Through database connection module 190, information from any number of persistent databases 155 may be sent to, or retrieved from, macro video analysis system 700 through a macro persistent database connection module 790. Such information received by macro persistent database connection module 790 may be stored within macro persistent database 755. Should an organization operate several respective retail locations 300, information from each retail location 300 may be sent to a single macro persistent database 755 where analysis on chain-wide statistics can be completed.

Macro persistent database 755 may store information from at least a portion of at least two remote persistent databases 155 and information gained by executing queries on data stored in macro persistent database 755. Database query interface 760 may interact with database query module 765 to run queries on the data stored by persistent database 755. Such query results may be returned to database query interface 760 for reporting purposes or stored in macro persistent database 755 as macro-event records and/or macro-event metadata and called upon by database query module 765 to retrieve and/or analyze the summarized information these macro event records and/or macro-event metadata hold.

Before information from persistent databases 155 can be stored in macro persistent database 755, macro persistent database module 750 may manipulate the database information received from persistent databases 155 such that information from persistent databases 155 is addressable by macro persistent database 755. Since information from two or more remote persistent databases may be stored in a single database, the addressing of each persistent database 155 may be modified to allow for assimilation in macro persistent database 755. Alternatively, a federated database approach may be employed.

Macro-event records and/or sets of macro-event metadata stored within macro persistent database 755 may not include video or images. Therefore, the digital size of event records and/or sets of event metadata and macro event records and/or sets of macro-event metadata may be small, advantageously allowing persistent storage of data or information in macro persistent database 755. Due to the small amount of data or information used to represent an event, macro persistent database 755 may be able to store data or information describing all events recorded therein for the operational lifespan of macro persistent database 755. Operational lifespans of macro persistent database 755 may be on the scale of five or ten years of continuous use. Persons of skill in the art would appreciate that some macro persistent database 755 may operate for over ten years.

Macro persistent database communication module 790 may be communicatively coupled to macro persistent database module 750 and at least two additional persistent database connection modules 190. Information from a remote persistent database 155 may be transmitted to the macro persistent database connection module 190 through a computer network, the Internet, or any other communication structure capable of transmitting data between persistent database communication module 790 and a remote persistent database connection module 190. Event records and/or event metadata created by analyzer 130 and evaluation module 160 stored within persistent databases 155 may be transmitted over such a communications connection to macro persistent database 755.

Persistent database connection module 190 may periodically establish a remote communication connection to macro persistent database connection module 790 after a period of time has elapsed, for instance 5 minutes. Alternatively, the period of time may be longer or shorter than 5 minutes, or macro persistent database connection module 790 may establish a continuous or persistent connection with persistent database connection module 190.

The communications may advantageously employ a time offset within a period to ensure that not all remote communication occurs at the same time. The time offset may be unique for each video analysis system, and may, for example, be advantageously based on a pseudorandom calculation seeded by a unique identifier assigned to each video analysis system. Such an approach may advatangeously distribute network traffic evenly or relatively evenly.

Once a communications connection between persistent database connection module 190 and macro persistent database connection module 790 is established, macro persistent database connection module 790 may query persistent database connection module 190 for any events generated since last a connection was established. Persistent database connection module 190 may then transmit event records and/or event metadata identified or recorded within persistent database 155 to macro persistent database connection module 790. Should the remote communications connection between persistent database connection module 190 and macro persistent database connection module 790 not establish for whatever reason, such as communication equipment failure, communication connection failure, and the like, macro persistent database connection module 790 may wait for the communications connection to be established to request the information new to persistent database 155 since a communications connection was last established. Such may prevent information from being lost should the remote connection not be establish for long periods of time. Event records and/or event metadata stored by persistent database 155 may be stored and available for transmission once the remote communications connection is again established. In some embodiments, persistent database connection module 190 may be aware of the last information successfully transmitted to macro persistent database connection module 790 and persistent database connection module 190 may not require macro persistent database connection module 790 to request information once a communication connection between persistent database connection module 190 and macro persistent database connection module 790 is established.

Macro video analysis system 700 may operate on a standard computing architecture known to persons of skill in the art.

Chain-wide statistics may provide valuable information for a chain of retail locations 300. By determining the busiest locations in the chain, staff and inventory may be allocated to maximize profits, and additional retail locations 300 may be opened to better serve the customers. Database query interface 760 may call on database query module 765 to execute database queries on the data stored within persistent database 155 to determine the occupancy and/or demographics of individuals in various retail locations 300 for instance a customer count, employee count and/or population count. Such population demographic information may be stored in macro persistent database 755.

Using logical groupings of video acquisition systems in respective retail locations 300 and identifying the total number of people at the respective retail locations 300, the number of customers at respective retail locations 300 can be compared. Information defining or specifying such relationships or logical groupings of entrances to respective retail zones 310 (FIG. 3) may be stored in respective persistent databases 155 and are therefore represented macro persistent database 755. By querying the respective logical groupings, population data for respective retail zones 310 may be generated and compared with all retail zones 310 chain-wide or with retail locations in certain geographical locations. Such information is not easily retrievable without video analysis system 700.

External data import module 770 may communicate with macro persistent database module 750. External data import module 770 may communicatively interface with devices within respective retail locations 310 such as point-of-sale (POS) terminals to import information stored within such POS terminals that have not been stored within persistent database 155. Further, information such as weather conditions, sports team schedules, vehicle traffic, holidays and local events within the vicinity of respective retail locations 310 may be imported through external data import module 770 into macro persistent database 755 through database query module 765.

Data analysis module 775 may call upon information imported by external data import module 770 and macro persistent database connection module 790 collected in macro persistent database 755. Data analysis module 775 may operate on a schedule and interface with macro persistent database 755 through database query module 765 to intelligently review information stored in macro persistent database 755 looking for meaningful relationships and trends within the entries of macro persistent database 755.

Figure 8:
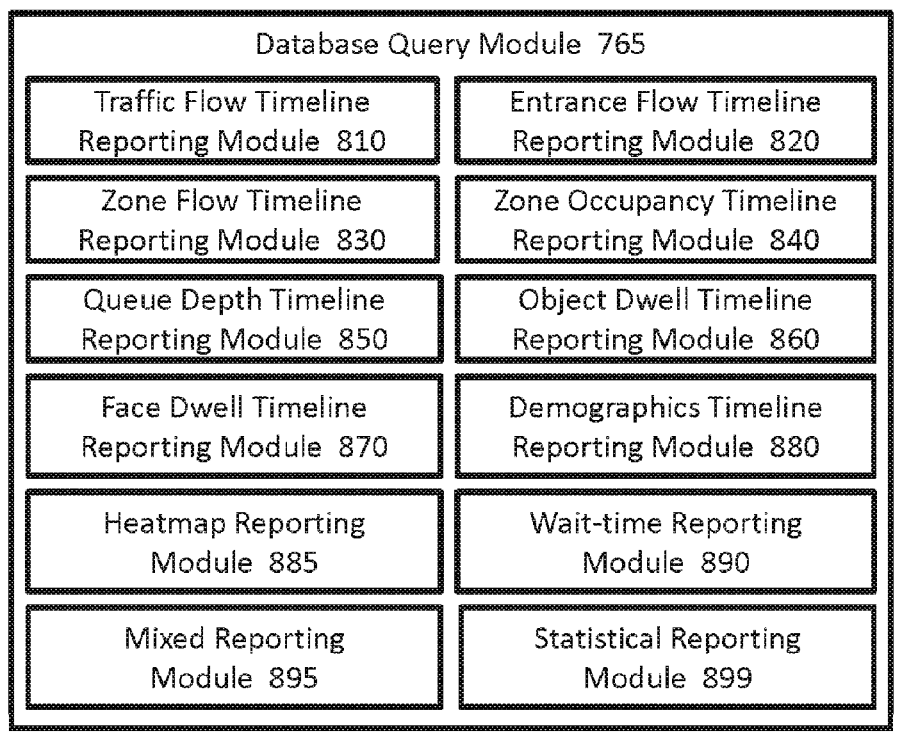
FIG. 8 is a schematic diagram of a database query module in accordance with an illustrated embodiment of the present systems and methods.

FIG. 8 shows a number of modules which may be executed by database query interface 760.

Database query interface 760 may execute a traffic flow timeline reporting module 810 from database query module 765. The traffic flow timeline reporting module 810 may determine the amount of traffic generated direction reports of individuals flow within a retail zone 300, for instance between retail region 410c and retail region 410b. A start region and an end region within an area monitored by a camera 130 may be specified for a selected period (e.g., 15 minutes, 1 hour, 1 day, 1 week, or longer) at a selectable interval (e.g., 5 minute intervals, 15 minute intervals, 1 hour intervals, 3 hours intervals, 1 day intervals, or longer). The flow of traffic from the start region to the end region is summarized by this database query. Information stored and summarized within macro persistent database 755 may be migrated to other large corporate databases through database query interface 760. Large corporate databases holding information on all aspects of a company, such as staffing, purchasing, finance, organizational information, and the like may retrieve information from macro persistent database 755 through database query interface 760.

Similarly, database query interface may execute entrance flow timeline reporting module 820 from database query module 765. The entrance flow timeline reporting module 820 may determine the flow between two regions through a constriction point between, for example, a public zone 340, 350 and a retail zone 310, or between a retail zone 310 and a sub-zone 320 or loading zone 330 within a retail location 300. The entrance may be specified as a grouping of at least one region within an area (e.g., entrance area 400), which is inside a zone or sub-zone (e.g.: retail region 410) and outside a zone or sub-zone (e.g., public region 440). Inflow is the number of individuals entering the interior physical or virtual zone through the entrance determined during a selectable period at selectable intervals. Outflow is the number of individuals leaving the physical or interior virtual zone through the entrance determined during a selectable period at selectable intervals. Such reports are returned to database query interface 760.

Zone flow timeline reporting module 830 of database query module 765 may be executed by database query interface 760. Zone flow timeline reporting module 830 may generate a report of the inflow (exterior to interior) and outflow of all entrance flow timeline module 820 results associated with a store zone (e.g., retail zone 310) or sub-zone (e.g., sub-zone 320, loading zone 330) during a selectable period at selectable intervals.

For example, events corresponding to the flow of individuals into and out of retail area 301 and other locations such as sub-zone 320 and loading zone 330 may be analyzed. Zone flow timeline reporting module 830 may produce data summarizing the flow patterns of individuals within retail zone 310. Such may show where popular locations within retail zone 310 exist, which doors are used most often to enter and exit retail zone 310, and other flow related information. Flow patterns may be time dependent such that at certain times of a day, one area may be busy. With such information, the layout of retail location 310 may modified to increase traffic to desired locations or to certain products in retail location 310.

The flow of individuals into and out of respective retail areas 310 may hold important information. The time of day when respective retail locations 300 see increased customer traffic may require additional staffing. By monitoring such activity over many stores throughout different geographic locations, the shopping habits of customers with respective retail locations 300 can be tracked and compared.

Zone occupancy timeline reporting module 840 of database query module 765 may be executed by database query interface 760. Zone occupancy timeline reporting module 840 may determine the occupancy of a store zone or sub-zone. Zone occupancy timeline reporting module 840 may run or execute along with the execution of zone flow timeline reporting module 840 to update the occupancy found for a zone or sub-zone. The occupancy calculated may be reset at a configurable time (e.g., 2 AM or another time where occupancy of the zone or sub-zone is known). Information regarding the amount of time people spend within sub-regions 320 may be very valuable. Retail locations 300 may be judged by corporate managers on the amount of traffic each respective remote retail location 400 drives to sub-regions 320. Sub-regions 320 may sell specialty products which may have some importance to the corporate owners, such as a premium price or high margins. Queries to summarize data produced by respective remote dwell-time evaluation modules 162 may be capable of evaluating the dwell-time of people within regions, such as respective remote sub-regions 320. These respective dwell-times may effectively be compared across a group of retail locations 300. Examining why certain remote sub-regions 320 are more successful than others may allow for better store design to direct traffic into such sub-regions 320.

Queue depth timeline reporting module 850 of database query module 765 may be executed by database query interface 760. Queue depth timeline reporting module 850 may determine the length of a queue. Queue depth timeline reporting module 850 may report on the percentage of occupancy of a queue represented by multiple regions of an area, imaged by a single camera or multiple cameras, for a selectable period at a selectable interval. Event records and/or event metadata associated with queue regions or areas by video acquisition system 316 may be used here to determine these statistics.

Object dwell timeline reporting module 860 of database query module 765 may be executed by database query interface 760. Object dwell timeline reporting module 860 may determine respective individual's dwell or linger duration for either regions or areas within retail zones for a selectable period at a selectable interval. Dwells by individuals may be classified based on the amount of time an individual spends within a region or area. Individuals who pass through a region without dwelling may be identified. Such behavior may be referred to as a "walkthrough." A report may be generated for database query interface indicating the percentage of individuals who dwelled or lingered within a region or area out of the total number of individuals who moved through a region or area. Event records and/or event metadata associated with dwell events by video acquisition system 316 may be used here to determine these statistics.

Video acquisition system 316 may also process images of the faces of customers directly and/or determine more specifically what objects are causing these individuals to dwell. Face dwell timeline reporting module 870 of database query module 765 may be executed by database query interface 760. Face dwell timeline reporting module 870 may report on face dwell duration (i.e., looking in a particular direction, for example, looking directly at the camera of video acquisition system 316). Such may be reported for selected regions for a selectable period at a selectable interval. A report may be generated for database query interface indicating the percentage of individuals who dwelled within a region out of the total number of individuals who moved through a region or area. One limitation associated with demographics is that it may be difficult to capture every individual's face that dwells within a region. For example, some individuals may look down when walking. Face dwell timeline reporting module 870 may allow a manager to determine how many individuals viewed an advertisement displayed within the store over a selectable period at a selectable interval.

Demographics classification timeline reporting module 880 of database query module 765 may be called by database query interface 760. Demographics classification timeline reporting module 880 may report on the percentage of individuals within a retail zone 310 by gender, percentage by ethnicity, percentage by age, and other demographics, for a selectable period at a selectable interval. Such demographic information may have already been analyzed by video analysis system 100 and demographics classification timeline reporting module 880 may summarize this information and generate reports regarding such demographics. Demographic information may be used to determine how best to advertise the products sold in retail locations 300. For instance, by querying demographic classification module 161 results from at least two remote persistent databases 155, differences in the at least two locations may be identified. Such demographic differences may be used to target advertising and promotional campaigns, and better allocate merchandise through the chain of remote retail locations 300. Additionally, information may be gained from queries on information imported to macro persistent database 755 regarding chain wide demographics information. Such summaries of demographics of individuals within remote retail locations may be a huge asset to retail chains.

Heatmap reporting module 885 of database query module 765 may be called by database query interface 760. Heatmap reporting module 885 may create a graphical summary of several heatmaps stored within macro persistent database 755, such as those shown in FIGS. 10A and 10B generated by heatmap module 166. Heatmap reporting module 885 may further generate comparative reports between two or more heatmaps for different selectable periods that may be normalized so that the color or shading scaling are the same for heatmap. As previously explained, heatmaps may be representative of occupancy (e.g., frequency of passage, dwell time) and, thus, may not be based on any thermal characteristics.

Wait-time reporting module 890 of database query module 765 may be called by database query interface 760. Wait-time reporting module 880 may summarize and determine better estimates of wait-times for respective wait-time estimation modules 164. Wait-time reporting module 890 may further generate comparative reports between two or more wait-times for different selectable periods or two or more locations to determine how best to deal with queues in respective retail locations 310.

Mixed reporting module 895 of database query module 765 may be called by database query interface 760. Mixed reporting module 896 may create summarized data entries in macro persistent database 755 from several sources such as information from a remote persist database 155 and information collected by external data import module 770. Data analysis module 775 may operate on a schedule and interface with macro persistent database 755 through database query module 765 to intelligently review information stored in macro persistent database 755. Database analysis module 775 may look for meaningful relationships and trends in the information stored in macro persistent database 755. Mixed reporting module 895 may summarize the findings of data analysis module 775 by, for example, generating reports on correlation between sales data and other data imported into macro persistent database 755 such as occupancy of a retail location, demographic information, heatmap information, the weather, vehicle traffic, holidays, sports team schedules, and the like.

Statistical reporting module 899 of database query module 765 may be called by database query interface 760. Statistical reporting module 899 may create summarized data entries within macro persistent database 755 and calculate statistically important numbers from the data. Minimum occupancy levels, maximum occupancy levels, average occupancy levels and median occupancy levels of zones such as retail zone 310, sub-zone 320 and loading zone 330 may be determined by statistical reporting module 899. Sales figures minimums, maximums, averages and medians for retail locations may be calculated, as well as additional metrics related to the performance of respective retail locations 300. Statistical reporting module 899 may also determine the standard deviation between these figures across a chain of retail locations 300, along with the variance of these statistics. Correlation between different sets of figures may be calculated by statistical reporting module 899. Persons of skill in the art would appreciate that statistical reporting module 899 may calculate many other standard statistical reporting figures useful in judging the relative performance of respective retail locations 300.

Figure 11:
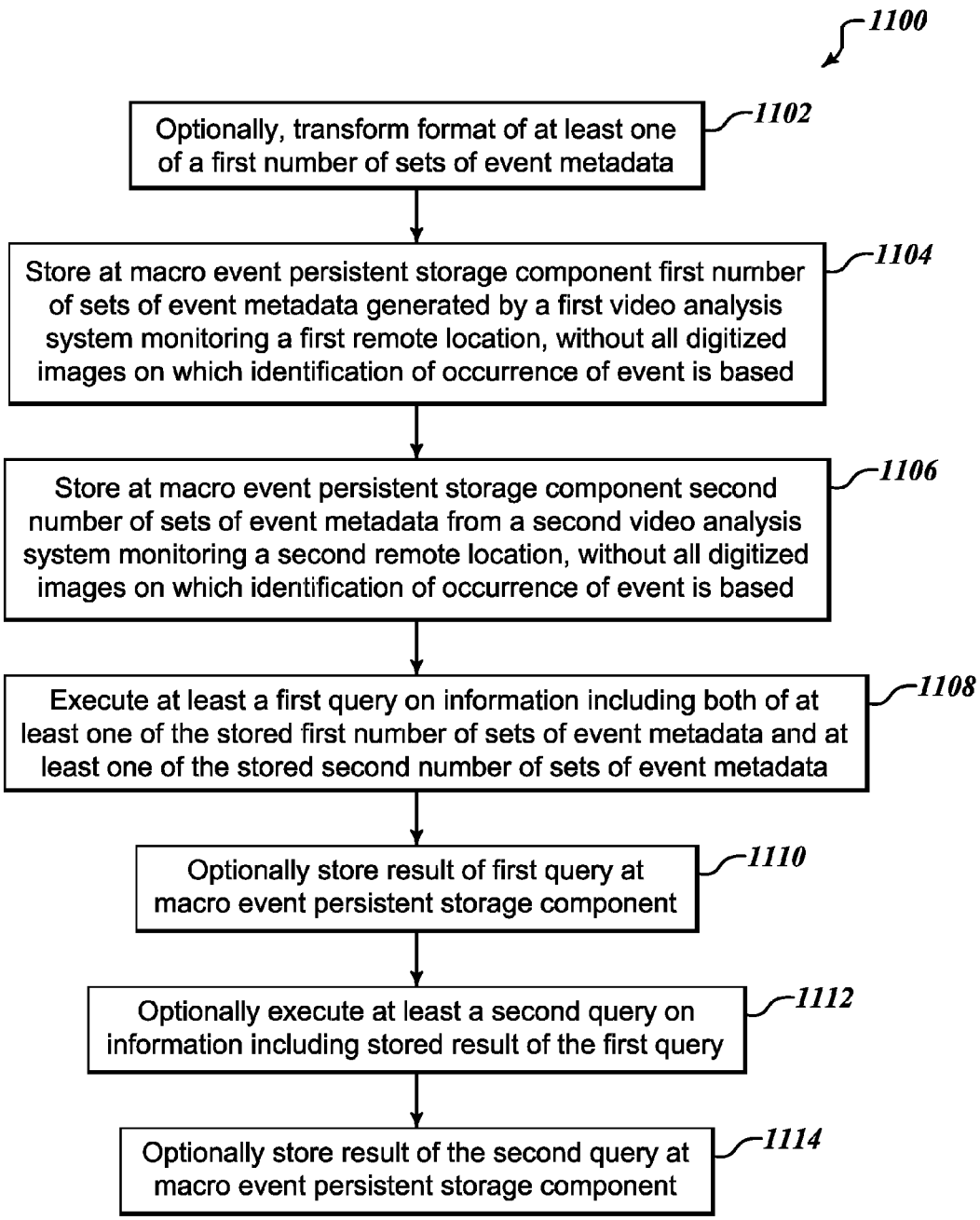
FIG. 11 shows a method of operating a macro video analytics system, according to one illustrated embodiment.

FIG. 11 shows a method 1100 of operating a macro video analytics system, according to one illustrated embodiment.

Optionally at 1102, a macro event persistent storage component or some other component transforms a format of at least one of the first number of sets of event metadata, in preparation to storing the first number of sets of event metadata. Such can accommodate for differences in format between systems and/or between databases.

At 1104, a macro event persistent storage component or some other component stores at a macro event persistent storage component a first number of sets of event metadata generated by a first video analysis system monitoring a first remote location. The location may be remote from the macro event persistent storage component. At least some (i.e., one or more) of the first number of sets of event metadata are indicative of an occurrence of respective ones of events occurring at the first remote location. The first number of sets of event metadata represents aspects of the respective event, without all of the digitized images on which identification of the occurrence of the event was based.

At 1106, a macro event persistent storage component or some other component stores at the macro event persistent storage component a second number of sets of event metadata from a second video analysis system monitoring a second remote location. Again, the second remote location may be remote from the macro event persistent storage component. At least some (i.e., one or more) of the second number of sets of event metadata are indicative of an occurrence of respective ones of events occurring at the second remote location. The second number of sets of event metadata represent aspects of the respective event, without all of the digitized images on which identification of the occurrence of the event was based.

At 1108, at least one processor executes at least a first query on information including both of at least one of the stored first number of sets of event metadata and at least one of the stored second number of sets of event metadata. The first query may, for example, be a database query, which is executed on event metadata or macro-event metadata generated by or from the two analyzers. The information may be stored in a common database, or the query may be performed across multiple databases, for example federated databases.

Optionally at 1110, at least one processor stores a result of the first query at the macro event persistent storage component. The result may be stored as a new macro-event record or macro-event metadata. This advantageously allows additional queries to be performed on information that includes the first result.

Optionally at 1112, at least one processor executes at least a second query on information including the stored result of the first query. Again, such may, for example, take the form of a database query. The second query is executed on information which may include the initial event metadata or macro-event metadata generated by or from the two analyzers, as well as the results of the first query, and possibly the results of other prior queries.

Optionally at 1114, at least one processor stores a result of the second query at the macro event persistent storage component. The result of the second query may be stored as a new macro-event record or macro-event metadata. This advantageously allows additional queries to be performed on information that includes the second result, in addition to, or in place of the first result.

Figure 12:
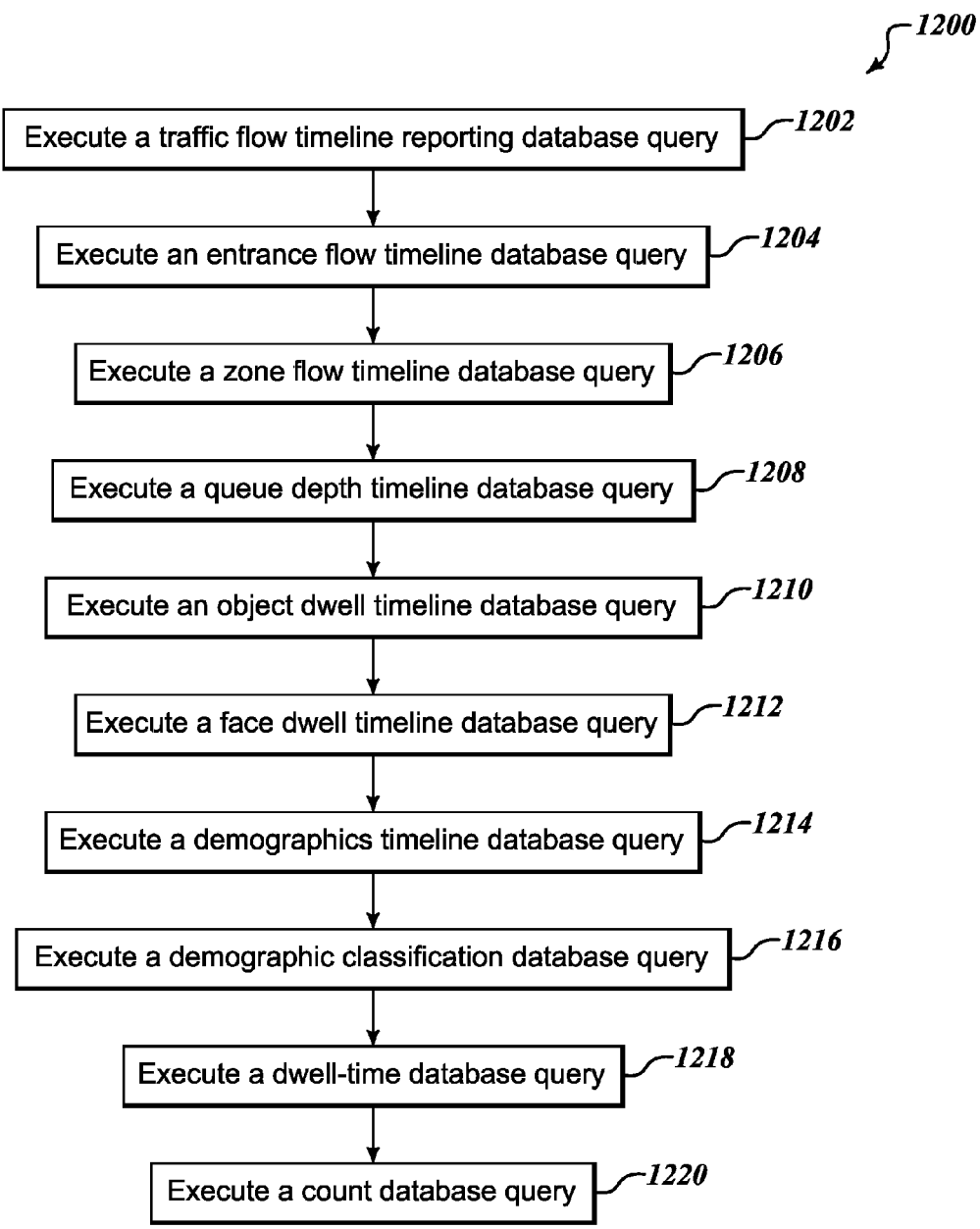
FIG. 12 shows a method of operating a macro video analytics system to perform queries, according to one illustrated embodiment, which may be useful in performing the executing of queries of the method of FIG. 11.

FIG. 12 shows a method 1200 of operating a macro video analytics system to perform queries, according to one illustrated embodiment. The method 1200 may be useful in performing the executing of queries 1108, 1112 (FIG. 11) of the method 1100.

At 1202, at least one processor executes a traffic flow timeline reporting database query. The traffic flow timeline reporting database query produces information which describes traffic flow at a location over a particular period of time. The general query may be preconfigured, with only selected parameters such as date, time location configurable.

At 1204, at least one processor executes an entrance flow timeline database query. The entrance flow timeline database query produces information which describes traffic flow at an entrance and/or exit of a particular location over a particular period of time. The general query may be preconfigured, with only selected parameters such as date, time location configurable.

At 1206, at least one processor executes a zone flow timeline database query. The zone flow timeline database query produces information which describes traffic flow through a particular zone of an area over a particular period of time. The general query may be preconfigured, with only selected parameters such as date, time location configurable.

At 1208, at least one processor executes a queue depth timeline database query. The queue depth timeline database query produces information which describes the length of a queue or line in terms of duration and/or length for a particular location over a particular period of time. The general query may be preconfigured, with only selected parameters such as date, time location configurable.

At 1210, at least one processor executes an object dwell timeline database query. The object dwell timeline database query produces information which describes the presence of an object (e.g., inanimate object) and length of time that the object has dwelled or remained at a particular location, possibly over a particular period of time. The general query may be preconfigured, with only selected parameters such as date, time location configurable.

At 1212, at least one processor executes a face dwell timeline database query. The face dwell timeline database query produces information which describes the act and/or length of time that a visual field of a particular person has dwelled or remained at a particular location, possibly over a particular period of time. Such may, for example, be associated with cameras located in or associated with signage, for example digital signage. Such can be correlated with the particular message being displayed by the signage to gauge interest, and may also be correlated with demographic information to allow targeting of messages or advertisements to selected groups of people. The general query may be preconfigured, with only selected parameters such as date, time location configurable. The actual identity of the person may be known or unknown.

At 1214, at least one processor executes a demographics classification timeline database query. The demographics classification timeline database query produces information which describes demographics of people in a particular location over a particular period of time. The general query may be preconfigured, with only selected parameters such as date, time location configurable. The information may specify individual demographics or statistical demographics.

At 1216, at least one processor executes a demographic classification database query. The demographic classification timeline database query produces information which describes generalized demographics of people at a particular location over a particular period of time. The general query may be preconfigured, with only selected parameters such as date, time location configurable.

At 1218, at least one processor executes a dwell-time database query. The dwell-time timeline database query produces information which describes the presence of a person and length of time that the person has dwelled or remained at a particular location, possibly over a particular period of time. The general query may be preconfigured, with only selected parameters such as date, time location configurable. The actual identity of the person may be known or unknown.

At 1220, at least one processor executes a count database query. The count database timeline database query produces information which describes the numbers of people at, or passing through, a particular location over a particular period of time. Such may reflect the number of customers, the number of employees and/or the total population. The general query may be preconfigured, with only selected parameters such as date, time location configurable.

Figure 13:
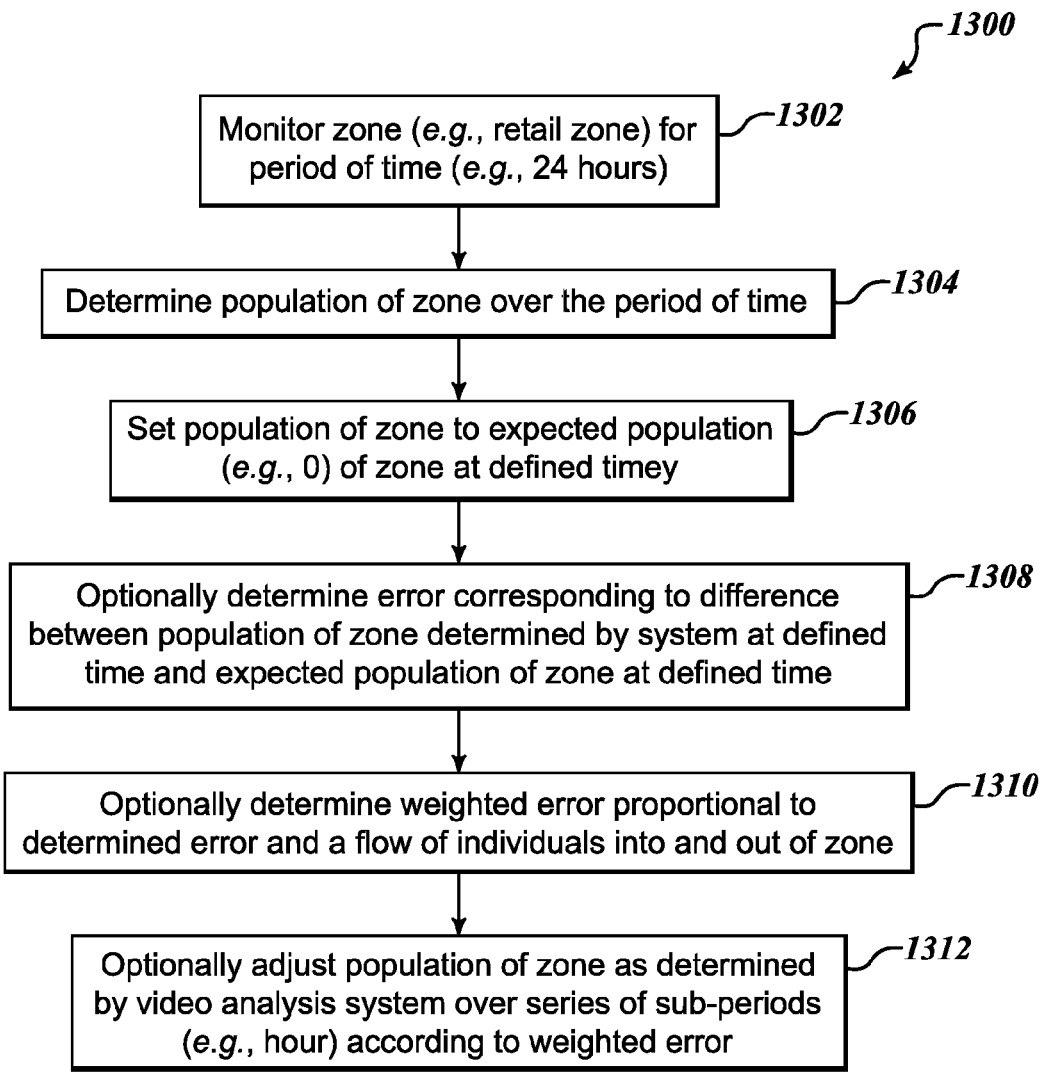
FIG. 13 shows a method of operating a macro video analytics system to monitor populations of areas, according to one illustrated embodiment, which may be useful in performing some of the acts of the methods of FIGS. 11 and/or 12.

FIG. 13 shows a method 1300 of operating a macro video analytics system to monitor populations of areas, according to one illustrated embodiment. The method 1300 may be useful in performing some of the acts of methods 1100 or 1200 (FIGS. 11 and 12).

At 1302, a video analysis system monitors a zone for a period of time. The zone may, for example, be a retail zone associated with a retail location such as a store. The zone may, for example, take the form of an entrance, exist, elevator, stairs, passage, department, checkout line, counter, etc. The video analysis system performs image processing on digital images captured by one or more cameras. The video analysis system may also process information from other non-image sources, for instance an RFID collection system.

At 1304, the video analysis system determines a population of the zone over the period of time. The time can be almost any period of time, for example 24 hours. Again, the video analysis system employs image processing on digital images captured by one or more cameras to determine population. The video analysis system may employ information from other non-image sources, for instance an RFID collection system. Such may, for example, be used to count the number of employees in the zone, the employees being required to wear badges with RFID transponders. The number of employees can be subtracted from the total population to determine the number of customers in the zone.

At 1306, at least one of the video analysis system or the video analytics system sets the population of the zone to an expected population of the zone at a defined time. Such may be used to account for possible miscounts or discrepancies in the population determination based on image processing. The defined time may, for example, following the period of time. The expected population may be almost any population, although a time when the expected population is zero or close to zero may prove most useful. Thus, in a retail location the expected population may be zero during certain hours of the night (e.g., midnight). Such may be used to reset or normalize the system.

Optionally at 1308, the video analysis system determines an error corresponding to a difference between a population of the zone determined by the image processing at the defined time and the expected population of the zone at the defined time.

Optionally at 1320, the video analysis system determines a weighted error proportional to the determined error and a flow of individuals into and out of the zone. Such allows the error to be correctly apportioned over what might be a rather large variation on population over time.

Optionally at 1322, the video analysis system adjusts the population of the zone as determined by the video analysis system over a series of sub-periods according to the weighted error. This may provide more accurate results.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Methods, or processes set out herein, may include acts performed in a different order, may include additional acts and/or omit some acts.

The various embodiments described above can be combined to provide further embodiments. U.S. Provisional Patent Application Ser. No. 61/340,382 filed Mar. 17, 2010 and U.S. Provisional Patent Application Ser. No. 61/396,169, filed May 24, 2010, are incorporated herein by reference in their entireties, These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a macro video analytics system, the method comprising:

persistently storing by a first micro event persistent storage component that is collocated with a first video analysis system and at a macro event persistent storage component a first number of sets of event metadata generated by the first video analysis system monitoring a first remote location remote from the macro event persistent storage component, at least some of the first number of sets of event metadata indicative of an occurrence of respective ones of events occurring at the first remote location, the first number of sets of event metadata representing aspects of the respective event, the first number of sets of event metadata stored in both the first micro event persistent storage component and the macro event persistent storage component without reference to any of a number of digitized images on which identification of the occurrence of the event was based;

transforming a format of at least one of the first number of sets of event metadata by the macro event persistent storage component before storing the first number of sets of event metadata at the macro event persistent storage component;

persistently storing by a second micro event persistent storage component that is collocated with a second video analysis system and at the macro event persistent storage component a second number of sets of event metadata from the second video analysis system monitoring a second remote location remote from the macro event persistent storage component, at least some of the second number of sets of event metadata indicative of an occurrence of respective ones of events occurring at the second remote location, the second number of sets of event metadata representing aspects of the respective event, the second number of sets of event metadata stored in both the second micro event persistent storage component and the macro event persistent storage component without reference to any of a number of digitized images on which identification of the occurrence of the event was based; and executing by at least one processor at least a first query on information including both of at least one of the stored first number of sets of event metadata and at least one of the stored second number of sets of event metadata.

2. The method of claim 1, further comprising:
storing a result of the first query at the macro event persistent storage component.

3. A method of operating a macro video analytics system, the method comprising:
persistently storing by a macro event persistent storage component a first number of sets of event metadata generated by a first video analysis system monitoring a first remote location remote from the macro event persistent storage component, at least some of the first number of sets of event metadata indicative of an occurrence of respective ones of events occurring at the first remote location, the first number of sets of event metadata representing aspects of the respective event, the first number of sets of event metadata stored in both the first micro event persistent storage component and the macro event persistent storage component without reference to any of a number of digitized images on which identification of the occurrence of the event was based;

transforming a format of at least one of the first number of sets of event metadata by the macro event persistent storage component before storing the first number of sets of event metadata at the macro event persistent storage component;

persistently storing by the macro event persistent storage component a second number of sets of event metadata from a second video analysis system monitoring a second remote location remote from the macro event persistent storage component, at least some of the second number of sets of event metadata indicative of an occurrence of respective ones of events occurring at the second remote location, the second number of sets of event metadata representing aspects of the respective event, the second number of sets of event metadata stored in both the second micro event persistent storage component and the macro event persistent storage component without reference to any of a number of digitized images on which identification of the occurrence of the event was based;

executing by at least one processor at least a first query on information including both of at least one of the stored first number of sets of event metadata and at least one of the stored second number of sets of event metadata;

storing a result of the first query at the macro event persistent storage component; and executing by at least one processor at least a second query on information including the stored result of the first query.

4. The method of claim 1 wherein executing by at least one processor at least a first query on information includes at least one of executing a traffic flow timeline reporting database query, an entrance flow timeline database query, a zone flow timeline database query, a zone occupancy timeline database query, a queue depth timeline database query, an object dwell timeline database query, a face dwell timeline database query, a demographics classification timeline database query, a customer count database query, an employee count database query, a population count database query, a track heatmap database query, a dwell heatmap database query, a wait-time database query, a mixed reporting database query, or a statistical reporting database query.

5. A macro video analysis system, comprising:
at least one processor; and
a macro event persistent storage component including at least one non-transitory storage medium communicatively coupled to the at least one processor and which stores processor executable instructions which when executed by the at least one processor cause the at least one processor to:

receive from a persistent nontransitory storage media disposed in a first micro event persistent storage component collocated in a first video analysis system a first number of sets of event metadata generated by the first video analysis system that monitors a first remote location remote from the macro event persistent storage component, at least some of the first number of sets of event metadata indicative of an occurrence of respective ones of events which occur at the first remote location, the first number of sets of event metadata which represent aspects of the respective event;

persistently store at least one non-transitory storage medium of the macro event persistent storage component the received first number of sets of event metadata, the first number of sets of event metadata stored in both the first micro event persistent storage component and the macro event persistent storage component without reference to any of a number of digitized images on which identification of the occurrence of the event was based;

transforming a format of at least one of the first number of sets of event metadata by the macro event persistent storage component before storing the first number of sets of event metadata at the macro event persistent storage component;

receive from a persistent nontransitory storage media disposed in a second micro event persistent storage component collocated in a second video analysis system a second number of sets of event metadata generated by the second video analysis system that monitors a second remote location remote from the macro event persistent storage component, at least some of the second number of sets of event metadata indicative of an occurrence of respective ones of events which occur at the second remote location, the second number of sets of event metadata which represent aspects of the respective event;

persistently store the at least one non-transitory storage medium of the macro event persistent storage component the received second number of sets of event metadata, the second number of sets of event metadata stored in both the second micro event persistent storage component and the macro event persistent storage component without reference to any of a number of digitized images on which identification of the occurrence of the event was based; and execute at least a first query on information including both of at least one of the stored first number of sets of event metadata and at least one of the stored second number of sets of event metadata.

6. The macro video analysis system of claim 5 wherein at least one of the first remote location and the second remote location is selected from the group consisting of: a retail location, a retail zone of the retail location, a sub-zone of the retail location, a loading zone of the retail location, a public zone of the retail location, and a constriction point between two zones of the retail location.

7. The macro video analysis system of claim 5 wherein the instructions cause the at least one processor to execute the first query for at least one of: a traffic flow timeline report, an entrance flow timeline report, a zone flow timeline report, a queue depth timeline report, an object dwell timeline report, a face dwell timeline report, a demographics classification timeline report, a track map report, or a wait-time report.

8. The macro video analysis system of claim 5 wherein at least one of the sets of event metadata is indicative of one of an occupancy of a zone, an individual transitioning between two zones, a set of demographic information for at least one individual, a dwell time of an individual in a region, a track map, or an estimation of a wait-time estimation.

9. A macro video analysis system of claim 5, comprising:
at least one processor; and
a macro event persistent storage component including at least one non-transitory storage medium communicatively coupled to the at least one processor and which stores processor executable instructions which when executed by the at least one processor cause the at least one processor to:
receive from a persistent nontransitory storage media disposed in a first micro event persistent storage component collocated in a first video analysis system a first number of sets of event metadata generated by the first video analysis system that monitors a first remote location remote from the macro event persistent storage component, at least some of the first number of sets of event metadata indicative of an occurrence of respective ones of events which occur at the first remote location, the first number of sets of event metadata which represent aspects of the respective event;
persistently store to the at least one non-transitory storage medium of the macro event persistent storage component the retrieved first number of sets of event metadata, the first number of sets of event metadata stored in both the first micro event persistent storage component and the macro event persistent storage component without reference to any of a number of digitized images on which identification of the occurrence of the event was based;
receive from a persistent nontransitory storage media disposed in a second micro event persistent storage component collocated in a second video analysis system a second number of sets of event metadata generated by the second video analysis system that monitors a second remote location remote from the macro event persistent storage component, at least some of the second number of sets of event metadata indicative of an occurrence of respective ones of events which occur at the second remote location, the second number of sets of event metadata which represent aspects of the respective event;
persistently store to the at least one non-transitory storage medium of the macro event persistent storage component the retrieved second number of sets of event metadata, the second number of sets of event metadata stored in both the second micro event persistent storage component and the macro event persistent storage component without reference to any of a number of digitized images on which identification of the occurrence of the event was based; and
execute at least a first query on information including both of at least one of the stored first number of sets of event metadata and at least one of the stored second number of sets of event metadata;
wherein the instructions further cause the at least one processor to store a result of the first query to the at least one nontransitory storage medium of the macro event persistent storage component.

10. The macro video analysis system of claim 9 wherein the instructions further cause the at least one processor to execute at least a second query on information including the stored result of the first query.

* * * * *